(12) United States Patent
Mukai et al.

(10) Patent No.: US 7,775,958 B2
(45) Date of Patent: Aug. 17, 2010

(54) SANITARY TISSUE PAPER, METHOD OF PRODUCING THE SAME, CARTON BOX FOR SANITARY TISSUE PAPER, SANITARY TISSUE PAPER PACKAGE, INTERFOLDER, AND APPARATUS AND METHOD OF CONVEYING SANITARY TISSUE PAPER PACKAGE

(75) Inventors: Takenaru Mukai, Iyomishima (JP); Yoshinori Shimizu, Iyomishima (JP); Shinya Sano, Fujinomiya (JP); Naomi Inaba, Fujinomiya (JP)

(73) Assignee: Daio Paper Corporation, Ehime (JP)

( * ) Notice: Subject to any disclaimer, the term of this patent is extended or adjusted under 35 U.S.C. 154(b) by 610 days.

(21) Appl. No.: 11/601,989

(22) Filed: Nov. 20, 2006

(65) Prior Publication Data

US 2007/0199670 A1 Aug. 30, 2007

Related U.S. Application Data

(62) Division of application No. 10/468,629, filed as application No. PCT/JP02/01408 on Feb. 19, 2002, now abandoned.

(30) Foreign Application Priority Data

| Feb. 20, 2001 | (JP) | ............................... 2001-44279 |
| Feb. 20, 2001 | (JP) | ............................... 2001-44280 |
| May 28, 2001 | (JP) | ............................. 2001-159090 |
| May 28, 2001 | (JP) | ............................. 2001-159091 |
| Jul. 13, 2001 | (JP) | ............................. 2001-213838 |

(51) Int. Cl.
*B31F 7/00* (2006.01)

(52) U.S. Cl. .......................... 493/356; 493/405; 270/40

(58) Field of Classification Search .................. 493/356, 493/396, 402, 403, 397, 405; 270/32, 37, 270/40, 41
See application file for complete search history.

(56) References Cited

U.S. PATENT DOCUMENTS 3,323,983 A * 6/1967 Palmer et al. ............... 162/362

(Continued)

FOREIGN PATENT DOCUMENTS

JP 57-78930 U 5/1982

(Continued)

OTHER PUBLICATIONS

M. Kouris, "Dictionary of Paper", 1996, TAPPI Press, 5th edition, p. 27.

(Continued)

*Primary Examiner*—Thanh K Truong
(74) *Attorney, Agent, or Firm*—Andrus, Sceales, Starke & Sawall, LLP

(57) ABSTRACT

The present invention aims at preventing sanitary tissue paper from being torn when it is removed. The purpose is accomplished by sanitary tissue paper of single-ply or double-plies, characterized in that said paper has a lateral tensile strength on a dry condition of 32 N/m or more, a longitudinal tensile strength on a wet condition 32 N/m or more, and a longitudinal tensile strength on a dry condition which is 2.5 to 3.5 times higher than the lateral tensile strength on a dry condition.

6 Claims, 23 Drawing Sheets

U.S. PATENT DOCUMENTS

| | | | | |
|---|---|---|---|---|
| 3,472,504 | A | * | 10/1969 | Spravniks et al. ............ 270/40 |
| 3,679,095 | A | * | 7/1972 | Nissen et al. ................ 221/50 |
| 3,867,872 | A | * | 2/1975 | Nystrand ................... 264/249 |
| 4,052,048 | A | | 10/1977 | Shirasaka |
| 5,093,068 | A | * | 3/1992 | Schulz ....................... 264/284 |
| 5,178,729 | A | | 1/1993 | Janda |
| 5,185,523 | A | * | 2/1993 | Kitagawa et al. ........... 250/281 |
| 5,227,023 | A | | 7/1993 | Pounder |
| 5,281,306 | A | | 1/1994 | Kakiuchi et al. |
| 5,382,464 | A | * | 1/1995 | Ruppel et al. ............... 428/172 |
| 5,779,860 | A | | 7/1998 | Hollenberg et al. |
| 5,840,404 | A | * | 11/1998 | Graff .......................... 428/154 |
| 5,954,625 | A | * | 9/1999 | Giesler, Sr. ................. 493/396 |
| 6,045,002 | A | * | 4/2000 | Wierschke ................... 221/48 |
| 6,123,557 | A | | 9/2000 | Wang et al. |
| 6,136,413 | A | * | 10/2000 | Le Port et al. .............. 428/154 |
| 6,187,141 | B1 | | 2/2001 | Takeuchi et al. |
| 6,514,382 | B1 | | 2/2003 | Kakiuchi et al. |
| 6,565,500 | B1 | * | 5/2003 | Hailey et al. ................ 493/405 |
| 2003/0097102 | A1 | | 5/2003 | Taniguchi |
| 2004/0112783 | A1 | | 6/2004 | Mukai et al. |
| 2004/0234805 | A1 | | 11/2004 | Hirasawa et al. |

FOREIGN PATENT DOCUMENTS

| | | |
|---|---|---|
| JP | 01237750 | 9/1989 |
| JP | 02-075515 | 3/1990 |
| JP | 03-060187 A | 3/1991 |
| JP | 03-106714 | 7/1991 |
| JP | 03-262193 A | 11/1991 |
| JP | 4-146300 | 5/1992 |
| JP | 06-072883 | 10/1994 |
| JP | 07-145588 | 6/1995 |
| JP | 08-003890 | 1/1996 |
| JP | 10-077595 | 3/1998 |
| JP | 10179441 | 7/1998 |
| JP | 10-338211 | 12/1998 |
| JP | 11-93055 | 4/1999 |
| JP | 11-130167 | 5/1999 |
| JP | 11-208606 | 8/1999 |
| JP | 11-334773 | 12/1999 |
| JP | 2000-007198 | 1/2000 |
| JP | 2000-080599 | 3/2000 |
| JP | 2000-256989 | 9/2000 |
| JP | 07197400 | 9/2000 |
| JP | 2001-029261 | 6/2001 |
| WO | WO-99/45204 | 9/1999 |
| WO | 00/31341 A1 | 6/2000 |

OTHER PUBLICATIONS

D. Eklund & T. Lindström, "Paper Chemistry, an Introduction" 1991, DT Paper Science Publications, 1st English edition, pp. 63-88.
International Search Report PCT/JP02/01408, May 20, 2002.
Saishin Kami Kako Binran (Latest Paper Converting Handbook), Techtimes Co., Ltd., Tokyo 1988, pp. 359-365.
Office Action stamped Jul. 22, 2008 for corresponding Korean Patent Application No. 2002-7014081.
Office Action stamped Jun. 9, 2008 for corresponding Korean Patent Application No. 2008-7006876.

* cited by examiner

FIG. 2
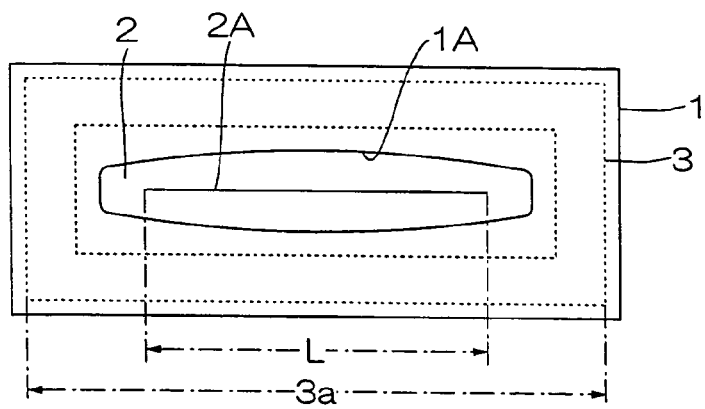
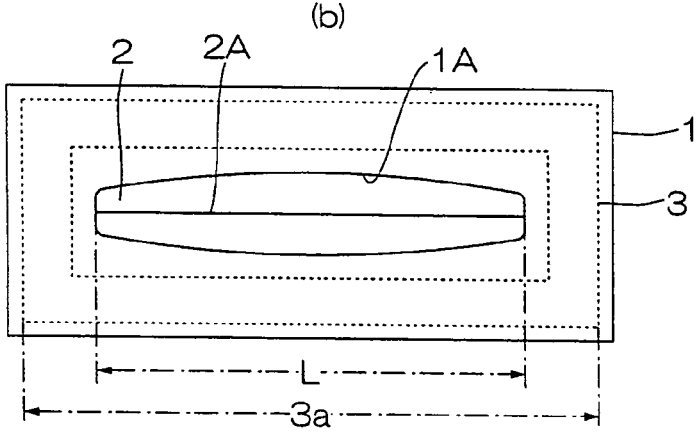
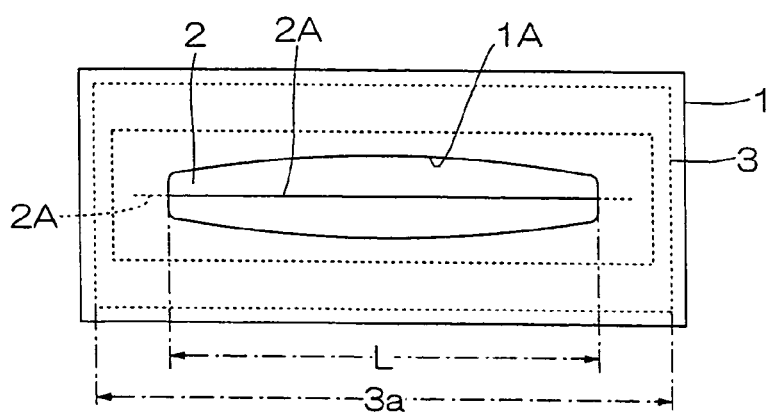

F I G. 11
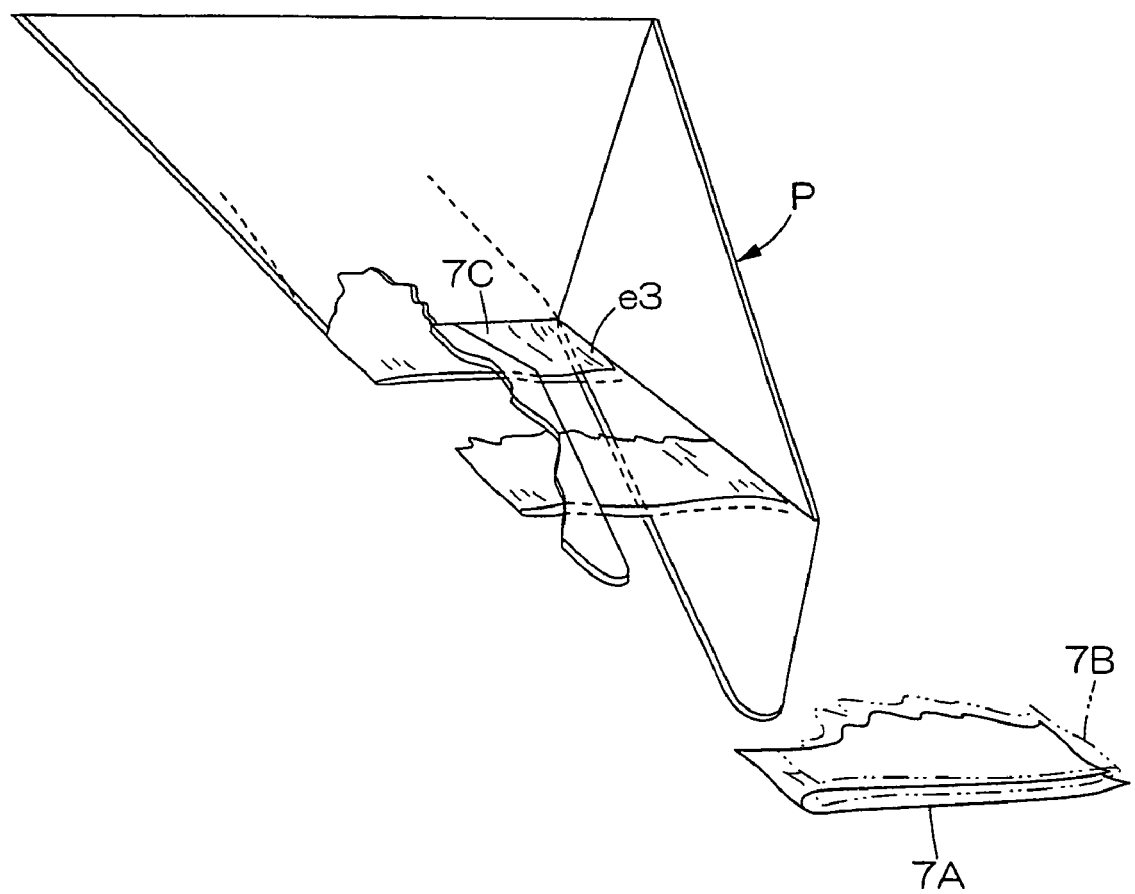

SANITARY TISSUE PAPER, METHOD OF PRODUCING THE SAME, CARTON BOX FOR SANITARY TISSUE PAPER, SANITARY TISSUE PAPER PACKAGE, INTERFOLDER, AND APPARATUS AND METHOD OF CONVEYING SANITARY TISSUE PAPER PACKAGE

CROSS REFERENCE TO RELATED APPLICATION

The present application is a divisional application of U.S. patent application Ser. No. 10/468,629, filed Feb. 5, 2004, now abandoned. The parent application is the U.S. national stage application of International Application PCT/JP02/01408, filed Feb. 19, 2002, which international application was published on Aug. 29, 2002 as International Publication WO 02/065885. The International Application claims priority of Japanese Patent Application 2001-44279, filed Feb. 20, 2001; Japanese Patent Application 2001-44280, filed Feb. 20, 2001; Japanese Patent Application 2001-159090, filed May 28, 2001; Japanese Patent Application 2001-159091, filed May 28, 2001; and Japanese Patent Application 2001-213838, filed Jul. 13, 2001.

FIELD OF TECHNOLOGY

The present invention relates to sanitary tissue paper which is preferable to make the thickness of a carton box smaller, carton box for tissue paper, and a package in which sanitary tissue paper is packed.

The present invention also relates to an interfolder which is used for stacking a plurality of continuous webs while folding by a folding board banks comprising a plurality of juxtaposed folding boards when packages are produced in which sanitary tissue paper is packed, and in particular to an interfolder in which paper particles are prevented from entering into spaces between the webs.

The present invention also relates to an improved technology of a facility of manufacturing sanitary tissue paper packages in which bonding of tissue paper plies by emboss working is improved.

The present invention also relates to a sanitary tissue paper package which is preferable for high speed and high efficient conveying, apparatus and method of conveying the same.

BACKGROUND

First Background

Sanitary paper such as tissue paper, toilet paper and toilet roll is an essential article for our living today for its convenience. The sheets of sanitary tissue paper are packed in a carton box having a window formed in the top face thereof, which is covered on the inner side with a sheet having a slit. The sheets of tissue paper inside thereof are sequentially pulled out through the slit. Thus packed tissue paper is required to provide excellent touch, soft feeling, and so enough strength that the paper is not torn and is endurable for its use.

It is known that the tissue paper is generally produced from 100% wood pulp and wood fibers having thin cellular walls are used and softening agents are blended to provide excellent touch and soft feeling. In view of increasing the strength, a beating method to enhance the blend ratio of the wood fibers having a high strength has been known.

However, use of special wood fibers in accordance with the former method will directly invites an increase in cost. On the contrary, an increase in strength will hinder to provide excellent touch and soft feeling.

Recently, efforts have been made to make the thickness of the carton box thinner without decreasing the number of sheets in view of convenience or portability on purchase of the tissue paper, and good appearance. In this case, when a sheet of tissue paper is removed through the slit after the product is purchased and the sealed window is opened, there is the danger that the tissue paper may be torn since the space between the tissue paper to be removed and inner tissue paper stack.

Tearing of the tissue paper on removal does not matter when the carton box is thick, so that the basis weight of one sheet is relatively high and the strength is high to some extent. However, it has been found that a serious problem may occur when the thickness of the carton box is decreased, that is the basis weight per one sheet is decreased without decreasing the number of sheets.

Second Background

With respect to manufacturing a package in which tissue paper is packed (hereinafter, also referred to as "tissue carton"), a facility which is referred to as "interfolder" has been practically used for folding tissue paper webs. One type of interfolder is configured to stack a plurality of continuous webs by means of a folding board bank comprising a plurality of juxtaposed folding boards while folding them. In the interfolder of this folding board type, paper particles are liable to occur since the edges of the folding boards are in friction with continuous webs. The paper particles are liable to deposit on the folding boards. In a rare case, the paper particles deposited on the folding boards may fall on a product as masses so that they may enter into the product.

Accordingly, a plurality of air blowing nozzles for blowing air toward the folding boards are fixed to blow away the paper particles deposited on the folding boards for removal.

Since such a conventional fixed type air blowing means has restrictions on the number and the place of installations, there may be weak air blown positions or dead spaces on the surface of folding boards, so that the paper particles can not be completely removed.

Third Background

A prior art facility for manufacturing tissue cartons has been proposed as follows: Tissue paper is firstly manufactured in a paper making machine and is rolled to make a primary paper rolls (generally referred to as "jumbo rolls"). The primary paper rolls JR, JR are set on a ply-machine 60 as shown in FIG. 16. Primary continuous webs 61, 62 which are dispensed from a plurality of primary paper rolls JR, JR are overlapped and cut (split into a plurality of rolls in a width direction) to manufacture secondary paper rolls 63 each comprising plural plies.

The secondary paper roll 63 which is manufactured by the ply-machine is taken out from the ply-machine and is then set on an interfolder (not shown). A secondary continuous web which is dispensed from the secondary paper roll in the interfolder is divided into a plurality of third continuous webs each having a width of product tissue. The plurality of third continuous webs are stacked while they are folded. The folded stack paper which is manufactured in the interfolder is sheared in a spaced manner in a longitudinal direction, and is packed in a carton and packaged in a facility at a subsequent stage.

On the other hand, this type of tissue paper has plies which are bonded by emboss working, so that they are not separated on use thereof. To this end, in a prior art facility separately comprising the above-mentioned ply-machine and interfolder, emboss bonding is carried out by means of an emboss roll 64 at a phase from overlapping of the paper plies 61, 62 to rolling of them in the ply-machine as shown in FIG. 16.

However, since the processing speed in the ply-machine is higher than that in the interfolder, embossing can not be uniformly provided in the ply-machine, so that separation of the plies, tearing of paper, or breaks at embossed portion is liable to occur and ply-bonding becomes unstable.

Although this problem can be solved by decreasing the processing speed of the ply-machine, it may lower the processing efficiency. Viewing the whole of the manufacturing facility, the manufacturing efficiency may be lowered as a whole since the ply-machine serves as a bottle-neck.

Fourth Background

In a general facility for manufacturing tissue cartons, after tissue paper is packed in the tissue cartons, which are then conveyed to a packaging machine via a conveying machine such as belt conveyor, so that each set comprising a plurality of tissue cartons is packed in a plastic bag and the like. Then, the packages are packed in carton boxes for shipping as products.

In such a facility for manufacturing tissue paper packages, the transfer direction of the transfer apparatus may be changed or the transfer face of the transfer machine may be tilted depending upon the arrangement and height of various devices which are provided on a line.

When tissue cartons are conveyed, they are accelerated or decelerated depending upon the processing speed of apparatus provided along the line. This acceleration or deceleration may be achieved by providing an upstream transfer apparatus which transfer the tissue cartons which are placed thereon and a downstream transfer apparatus which transfers the tissue cartons placed thereon at a speed which is lower or higher than that of the upstream transfer apparatus.

Since the tissue carton has its height which is less than its depth, the transfer efficiency is enhanced by transferring the tissue carton in a height direction with its front face or rear face side down rather than transferring them in a depth direction with its bottom face side down. Accordingly, the prior art facility is provided at the starting end of the carton transfer apparatus with a carton erecting apparatus which receives tissue cartons which are fed in a depth direction with their bottom side down and feeds out them in a height direction with their front face of rear face side down.

Recently, ultra-compact type tissue cartons having a height less than 6 cm have been developed and are already on their way to becoming dominant in the market.

However, as will be described in detail turning over or unstable attitudes (postures) of the tissue cartons may occur in the prior art conveying method.

(A) If the tissue cartons are transferred on a curved or tilted transfer face without any support, the tissue cartons may assume unstable attitudes or turn over.

This problem can be solved by decreasing the transfer speed of the transfer apparatus (that is, the moving speed of the transfer speed). Lowering of the conveying efficiency, and thus lowering of the manufacturing efficiency is inevitable. On the other hand, if a conveying mode in which the tissue cartons are conveyed in a height direction with their front or rear face side down by means of the above-mentioned erecting and feeding apparatus is adopted, lowering of the conveying and/or manufacturing efficiency can be avoided. Unstable attitudes or turning over of the cartons is liable to occur since the usual tissue cartons have an area of the front or rear face which is less in comparison with that of the bottom.

Since the above-mentioned ultra-compact type tissue cartons have an area of the front or rear face which is remarkably less, turning over or assuming unstable attitudes is inevitable unless the transfer speed of the transfer apparatus is lowered in a mode in which they are conveyed in a height direction with their front or rear face side down.

(B) If the conveying speed of the tissue cartons is increased or decreased by making the conveying speed of the downstream transfer apparatus different from that of the upstream transfer apparatus, the tissue cartons may assume unstable attitudes or turn over due to a change in speed when the tissue cartons placed on the upstream transfer apparatus are transferred to the downstream transfer apparatus moving at a transfer speed which is higher or lower than that of the upstream transfer apparatus.

Although this problem can be solved by decreasing the difference between the speed of the upstream and downstream transfer apparatus, lowering of the manufacturing efficiency is inevitable since the lower speed of the transfer apparatus will become dominant.

A conveying mode can be adopted in which the tissue cartons are conveyed in a height direction with their front or rear face side down by using the above-mentioned erecting and feeding apparatus for conducting the decelerated or accelerated conveying. Since the processing speed at the phase from the packing of the tissue paper to the erecting apparatus is relatively higher, decreasing of the conveying speed may be necessary when the tissue cartons are transferred from the erecting and feeding apparatus to the downstream conveying apparatus. In this case, the erecting and feeding apparatus constitutes the upstream transfer apparatus. Although conveying of the tissue cartons with such an attitude will prevent the lowering of the conveying and manufacturing efficiency, the tissue cartons are liable to assume unstable attitudes or to turn over since the usual tissue cartons have an area of the front or rear face which is less than that of the bottom.

In case where deceleration or acceleration is conducted in such a manner, turning over of the cartons is inevitable unless the acceleration or deceleration is remarkably reduced in a mode in which the cartons are decelerated while they are transferred in a height direction with the front or rear face side down since the ultra-compact type tissue cartons have an area of the front or rear face which is remarkably less.

(C) On the other hand, a problem that the tissue cartons may be turned over when the moving speed of the transfer face (hereinafter simply referred to as "transfer speed") is changed, particularly the line operation is started or stopped if the prior art transfer mode is adopted in which the ultra-compact type tissue cartons are transferred in a height direction with their front or rear face side down while they are placed with the front or rear face side down since they have a remarkably small area of the front or rear face as mentioned above.

Accordingly, a mode can be adopted in which the ultra-compact type tissue cartons are transferred at a high speed with stable attitudes in which the wide bottom is side down. However, there is a limitation in the transfer speed due to the relationship with the processing speed of the apparatus which conducts the transfer. The transfer efficiency is limited to about 230 cartons/minute, so that lowering of the manufacturing efficiency is inevitable since the depth of the carton is 110 mm or more even assuming the transfer speed is 35 cm/minute or more.

DISCLOSURE OF THE INVENTION

The Invention for Accomplishing a First Object

A first object of the present invention is to make it possible to remove sheets of sanitary tissue paper from a carton box without tearing them. Accordingly, the present invention also contemplates to provide sanitary tissue paper which provides excellent touch, and soft feeling, particularly softness, smoothness and excellent thickness feeling and has an enough strength.

This object is accomplished by sanitary tissue paper of single-ply or double-plies, characterized in that said paper has a lateral tensile strength on a dry condition of 32 N/m or more, a longitudinal tensile strength on a wet condition 32 N/m or more, and a longitudinal tensile strength on a dry condition which is 2.5 to 3.5 times higher than the lateral tensile strength on a dry condition.

In the sanitary tissue paper, it is preferable that said paper has a basis weight of one sheet which is 11 $g/m^2$ or less, a density of 0.18 to 0.21 $g/cm^3$ and a thickness of 50 to 60 μm. It is preferable that NBKP (Needle Bleached Kraft Pulp) and LBKP (Leafy Bleached Kraft Pulp) is mainly made of raw material pulp, the ratio of NBKP to LBKP being 10:90 to 70:30.

When this sanitary tissue paper is made, it is preferable that said paper is made at a ratio of paper making water flow speed/wire speed (J/W ratio) which is 0.92 to 1.00.

On the other hand, the above-mentioned object is also accomplished by a carton box for sanitary tissue paper characterized in that a window formed in the top face of the carton is covered on the inner side thereof with a sheet having a slit through which a number of sheets of folded and stacked sanitary tissue paper are sequentially pulled out, and in that the effective length of said slit is 70 to 90% of the length of said sanitary tissue paper in a lateral direction.

Viewing the whole of the package in which the sanitary tissue paper is packed, the above-mentioned object is accomplished by a package for sanitary tissue paper characterized in that said package has a window formed in the top face thereof, which is covered on the inner side thereof with a sheet having a slit through which a number of folded and stacked sheets of sanitary paper in double-plies are sequentially pulled out, characterized in that the effective length of said slit is 72 to 90% of the length of said sanitary tissue paper sheet in a lateral direction, and in that the basis weight of said sanitary tissue paper is 10 to 22 $g/m^2$ and the lateral tensile strength on a wet condition is 32 N/m or more.

In this case, the longitudinal tensile strength of the sanitary tissue paper is preferably 1.5 to 4 times of the lateral tensile strength thereof. The sanitary tissue paper is preferably packed in a carton box so that the number of crepes of the sanitary tissue paper is 30 to 55/cm, and the sanitary tissue paper sheets are packed so that the apparent density at the phase of product is 0.10 to 0.20 $g/cm^3$. The sanitary tissue paper preferably is packed in a carton box so that the rate of crepes of the sanitary tissue paper is 10 to 28%, the longitudinal elongation is 7 to 20%, and the sanitary tissue paper sheets are packed so that the apparent density at the phase of product is 0.10 to 0.20 $g/cm^3$.

The above-mentioned object is also accomplished by a package for sanitary tissue paper characterized in that said package has a window formed in the top face thereof, which is covered on the inner side thereof with a sheet having a slit through which a number of folded and stacked sheets of sanitary paper in double-plies are sequentially pulled out, characterized in that said sanitary tissue paper sheets are packed in said carton box so that the longitudinal tensile strength of said sanitary tissue paper on a dry condition is 160 N/m or less, the longitudinal elongation is 7 to 20% and the recovery rate of the sanitary tissue paper bundle after it was left in a drier at 60° C. is 20% or less.

The Invention for Accomplishing a Second Object

It is a second object of the present invention to enable an interfolder having folding boards to uniformly remove paper particles deposited on the folding boards.

This object is accomplished by providing an interfolder for stacking a plurality of continuous webs while folding them by means of a folding board bank comprising a plurality of juxtaposed folding boards, characterized in that said interfolder is provided with movable air blowing means for blowing air toward at least said folding boards while said means moves in the vicinity of said folding boards.

If air is blown upon the folding boards while moving around the vicinity of the folding boards in such a manner, the air can be uniformly applied to the surfaces of the folding boards, so that the paper particles deposited upon the folding boards can be uniformly removed.

In this case, the interfolder is preferably provided with stationary air blowing means for blowing air toward said folding boards in a predetermined direction together with said movable air blowing means. If the fixed air blowing means is provided in combination with the movable air blowing means in such a manner, the paper particles which are left even by the normal blowing from the fixed air blowing means can be removed by the uniform blowing from the movable air blowing means. Therefore, the paper particles deposited on the folding boards can be substantially completely removed.

The movable air blowing means preferably comprises guide rails secured along said folding boards in a juxtaposing direction; a base unit which is guided on and along the guide rails for reciprocating; a drive for driving said base unit for reciprocating it; a fan which is mounted on said base unit; an air duct which is connected to the air exit of said fan and has a communicating portion which passes the vicinity of said folding board bank in a vertical direction and an air blowing slits which are formed in the communicating portion of said air duct in a vertical direction, in the height range corresponding to at least said folding boards. Blowing air toward the folding boards from slits extending in a vertical direction in such manner provides an advantage that the air can be uniformly blown toward the surfaces of the folding boards.

Said movable air blowing means is preferably configured to blow air in the range covering adjacent plural folding boards while it reciprocally moves in a juxtaposing direction of said folding boards. If both fixed type and movable air blowing means are used in a combined manner, cost of the facility and its running cost can be suppressed to a minimum value by configuring the line so that air blowing toward a plurality of (preferably all) folding boards is successively conducted by a single movable air blowing means when the deposit of the paper particles on the folding board is less.

The Invention for Accomplishing a Third Invention

It is a third object of the present invention to uniformly provide embosses and to make harder the separation of plies and the occurrence of tearing and breaks of paper at the embossed portion.

This object is accomplished by providing an interfolder which is configured to stack a plurality of continuous webs in plural-plies while folding them, characterized in that said interfolder is provided with emboss bonding means for bonding plies to each other by embossing paper roll prior to said folding.

Since the processing speed in the interfolder is about 130 m/minute which is less than that in the ply-machine, embosses can be uniformly provided by subjecting the paper roll to the emboss working for bonding the plies to each other prior to folding in the interfolder so that separation of plies and tearing and breaks of paper at the emboss provided portion will be harder to occur. Even if the interfolder is provided with emboss bonding means, folding processing will no become unstable due to low processing speed.

Specifically, in an interfolder including a paper roll support and a folding mechanism, in which a paper roll comprising a plurality of sheets of plies, which is preliminarily formed with slits which match with the width of products is mounted on said paper support, and in which plurality of continuous webs dispensed from the paper roll are guided to said folding mechanism so that they are stacked while being folded, it is recommended that said interfolder is provided in a guide path of a continuous web leading from said paper roll support to said folding mechanism with an emboss bonding apparatus including a pair of rolls at least one of which having embossing convexes on the outer periphery thereof, and that the plies are bonded to each other by subjecting said continuous web to an emboss working by means of said emboss bonding apparatus prior to said folding.

On the other hand, there is proposed a facility for manufacturing sanitary tissue paper including a ply-machine for manufacturing secondary paper rolls by rolling primary continuous webs dispensed from a plurality of primary paper rolls while overlapping them and slitting them to match the width of products, and an interfolder on which said secondary paper rolls which have been produced by the ply-machine are mounted, for stacking the plurality of secondary continuous webs having the same width as that of the products, dispensed from the ply-machine while folding them, characterized in that said interfolder is provided with emboss bonding means for embossing said secondary continuous web to bond them to each other prior to said folding. If it suffices not to use the emboss bonding means in the ply-machine, the processing speed in the ply-machine will not be lowered and the processing will not become unstable. Providing the interfolder having a lower processing speed in comparison with that of the ply-machine with emboss bonding means makes it possible to uniformly provide emboss, so that separation of plies and tearing and breaks of paper at the emboss provided portion hardly occurs.

The Invention for Accomplishing a Fourth Object

It is a fourth object of the present invention to prevent a tissue carton from turning over or assuming unstable attitudes without lowering the conveying efficiency when sanitary tissue paper packages such as tissue cartons are conveyed.

This object is accomplished by a sanitary tissue paper package characterized in that it comprises a carbon box having a width of 233 to 253 mm, a depth of 110 to 130 mm and a height less than 60 mm; and in that a stack of sanitary tissue paper sheets in said carton box, which is folded and packed so that it has a width of 220 to 240 mm and a height of 40 to 60 mm, in that the spacing between the inner side of said carton box and the sanitary tissue paper stack is such that the total spacing on both sides in a width direction is 10 to 16 mm, the total spacing on both sides in a depth direction is 0 to 3 mm and the total spacing on both sides in a height direction is substantially zero; in that the package has a weight of 150 to 250 g; and in that the gravity center is located in the range of ±10 mm, ±10 mm and ±5 mm relative to the center positions of the width, depth and height, respectively.

The present invention contemplates to prevent, particularly ultra-compact type sanitary tissue paper package from turning over or assuming unstable attitudes from the view point of gravity center characteristics. If the tissue paper packages has such gravity center characteristics, the tissue paper package is unliable to turn over or to assume unstable attitudes when it is conveyed in a height direction with its front or rear face side down.

In this case, the dynamic and static frictional coefficients on the front or rear face are preferably 0.15 to 0.25 and 0.18 to 0.33, respectively. The tissue paper package is unliable to turn over or assume unstable attitudes by configuring the package so that the dynamic coefficient on the front face or rear face is 0.18 to 0.33 even if it is conveyed in a height direction with the front face or rear face with side down as mentioned above.

The above-mentioned fourth object of the present invention is also accomplished by an apparatus for conveying sanitary tissue paper packages characterized in that said apparatus is provided with a transfer apparatus for transferring the sanitary tissue paper packages on which they are placed thereon and an attitude restriction means which moves along the sanitary tissue paper packages placed on said transfer apparatus at a speed in the range of 10% relative to the transfer speed of the transfer apparatus. The present invention contemplates to prevent the package from turning over or assuming unstable attitudes by a mechanical support. By providing an attitude restriction member which moves along packages at a speed close or equal to the transfer speed of the relevant transfer apparatus, the package is prevented from assuming unstable attitudes or turning over since the package placed on the transfer apparatus is restricted by the attitude restriction member which moves in the same direction at a speed close or equal to that of the attitude restriction member even if the attitudes of the package are restricted by the attitude restriction member. The attitudes of the package are made stable by mechanically supporting the package depending upon the conveying speed without decreasing the transfer speed of the transfer apparatus, so that the efficiency of conveying and manufacturing will not be lowered.

This conveying apparatus is suitable for a case in which the transfer apparatus is configured to transfer the sanitary tissue paper packages in a height direction with their front or rear face down side. If the packages are conveyed with such an attitude, the packages are liable to turn over or to assume unstable attitudes while the efficiency of the conveying or manufacturing is high. In the present invention, the packages are effectively prevented from assuming unstable attitudes or turning over by the action of the inventive attitude restriction member.

Said attitude restriction member is preferably provided above and in a spaced relationship with said transfer apparatus for transferring said sanitary tissue paper packages while they are located between said attitude restriction member and said transfer apparatus. Although the attitude restriction members may be provided on the both sides of the transfer apparatus, disposition of the attitude restriction members in a spaced relationship with and above the transfer apparatus provides an excellent effect of preventing the packages from assuming unstable attitudes and turning over. Providing the attitude restriction members on both sides of the transfer apparatus may complicate the arrangement of the apparatus or may impose restrictions upon the installation location. There is often a space in which no member exists above the transfer apparatus such as usual belt conveyor. Accordingly, by providing the attitude restriction member above the transfer apparatus, the arrangement of the apparatus can be simplified or installation of the apparatus is made possible without restriction.

On the other hand, the transfer speed of the packages may be increased or decreased in the conveying apparatus. In this case, the above-mentioned fourth object is accomplished by an apparatus for conveying sanitary tissue paper packages including an upstream transfer apparatus for transferring said sanitary tissue paper packages while they are placed thereon, and a downstream transfer apparatus on which said sanitary tissue paper packages transferred from said upstream transfer apparatus are placed for transferring said sanitary tissue paper packages at a speed which is lower or higher than that of said upstream transfer apparatus while said sanitary tissue paper packages are placed, characterized in that said conveying apparatus further includes an upstream attitude restriction member which moves from a predetermined position to said transfer position along the sanitary tissue paper packages on said upstream transfer apparatus at a speed in the range of ±10% of that of said upstream transfer apparatus; and an downstream attitude restriction member which moves from a predetermined position to said transfer position along the sanitary tissue paper packages on said downstream transfer apparatus at a speed in the range of ±10% relative to that of said downstream transfer apparatus. In such a manner, the upstream or downstream transfer apparatus are provided with the attitude restriction members which move at a speed close or equal to that of the transfer speed of the corresponding transfer apparatus, respectively. Accordingly, the packages will not assume unstable attitudes or turn over since the upstream or downstream attitude restriction member which moves at a speed close or equal to that of the transfer speed in the same direction as the transfer direction restricts the attitudes of the packages when the packages placed on the upstream transfer apparatus in transferred on the downstream transfer apparatus having a transfer speed which is higher or lower than that of the upstream transfer apparatus. By mechanically supporting the packages depending upon an increase or decrease in the conveying speed, the packages can be decelerated without disturbing their attitudes even if the speed difference is high, so that manufacturing efficiency will not be lowered.

The present invention is particularly effective to a form in which said upstream transfer apparatus is a package erecting and feeding apparatus for receiving the sanitary tissue paper packages which have been fed in a depth direction with its bottom face side down and for feeding them in a height direction with its front or rear face side down; and said downstream transfer apparatus is a belt conveyor for receiving sanitary tissue paper fed from said upstream transfer apparatus while keeping their attitudes on feeding and for feeding said sanitary tissue paper packages in a height direction with its front or rear face side down. Although conveying of the packages with such an attitude makes the manufacturing efficiency higher, the packages are liable to turn over or to assume unstable attitudes due to the difference in speed. However, in the present invention the packages are effectively prevented from assuming unstable attitudes or turning over by the action of the above-mentioned attitude restriction member of the present invention.

In this case, it is recommended to adopt a form in which said upstream restriction member is provided on each of the both sides of said upstream transfer apparatus; and said downstream attitude restriction member is provided on each of the both sides of said downstream transfer apparatus; the spacing between said upstream attitude restriction members is constant in a feeding direction; and the spacing between said downstream attitude restriction members becomes narrower as they approach toward downstream side. By configuring the attitude restriction members in such a manner, transfer of the tissue cartons from the upstream to downstream transfer apparatus can be conducted is a more smooth manner.

The present invention which accomplishes the fourth object is particularly preferable to transfer a sanitary tissue paper package having a height which is less than 6 cm. Since the ultra-compact type package has an area of the front or rear face which is remarkably small will be inevitably turned over unless the manufacturing efficiency is lowered by decreasing the conveying speed or difference in speed. In accordance with the present invention, the tissue paper package is effectively prevented from assuming unstable attitudes or turning over by the action of the above-mentioned attitude restriction member.

Said attitude restriction member is preferably configured to move at a speed in the range of ±5% of that of said transfer apparatus. The above-mentioned attitude restriction function is effectively performed by making the moving speed of the attitude restriction member substantially equal to the transfer speed of the relevant transfer apparatus. In the present application, methods which are performed using the above-mentioned apparatus will also be proposed.

On the other hand, a control for increasing or decreasing the transfer speed of the transfer apparatus such as belt conveyor may also be conducted. In this case, the above-mentioned fourth object is accomplished by a method of conveying sanitary tissue paper packages for controlling the moving speed of a transfer face when sanitary tissue paper packages having a height not higher than 6 cm are placed on said transfer face of a transfer apparatus in an erect position with their front or rear face side down and are moved while keeping their placed attitude by moving said transfer face, characterized in that the moving speed of said transfer face is changed at a rate of 0.01 to 1.00 m/s$^2$.

In accordance with the present invention, turning over of the package when the transfer speed is changed can positively be prevented by changing the transfer speed at a rate of 0.01 to 1.00 m/s (including both acceleration or deceleration) even if the ultra-compact type package having a height less than 6 cm is placed on the transfer face of the transfer apparatus in an erect position with its front or rear face side down and is transferred by moving the transfer face while keeping this erect position. Since the transfer of package in an erect position with its front or rear face side down is possible, the transfer efficiency can be enhanced to a maximum value.

The above-mentioned fourth object is also accomplished by conducting a method of conveying sanitary tissue paper packages on a package processing line which is configured to place sanitary tissue paper packages having a height not higher than 6 cm on a transfer face of a transfer apparatus in an erect attitude with their front or rear face side down and to move said sanitary tissue paper packages while keeping their placed attitude by moving said transfer face, characterized in that the moving speed of said transfer face is increased from 0 m/minute to 35 m/minute at a rate of 0.01 to 1.00 m/s$^2$ at the beginning of the operation of said line; then a normal operation is conducted while the speed of 35 m/minute or more is kept and the moving speed of the transfer face is decreased from the speed of 35 m/minute or higher on the normal operation to 0 m/minute at a rate of 0.01 to 1.00 m/s² until the line operation is stopped.

Viewing the whole of the processing line of the packages, the transfer speed is increased or deceased when the line operation is started or stopped. The operation can be started or stopped without causing the package to turn over since the acceleration or deceleration is conducted at a rate of 0.01 to 1.00 m/s² on starting or stopping of the operation in accordance with the present invention. When the rate of acceleration or deceleration falls below 0.01 m/s², the package can be prevented from turning over while it is hard to compensate for the lowering of the processing efficiency by an increase in transfer speed. If the package is turned over on starting of the operation, labor and time is required to process it, resulting in a decrease in processing efficiency. In accordance with the present invention, such a problem is solved. The transfer speed on steady operation can be increased to 35 m/minute or more by the turning over preventing effect which is provided by the transfer in an erect position and control of acceleration or deceleration resulting in that the processing efficiency can be increased to 550 packages/minute or more.

BRIEF DESCRIPTION OF THE DRAWINGS

FIG. 2 is a plan view showing the carton box.

FIG. 11 is an enlarged schematic view showing a folding way.

BEST MODES FOR EMBODYING THE INVENTION

Figure 1:
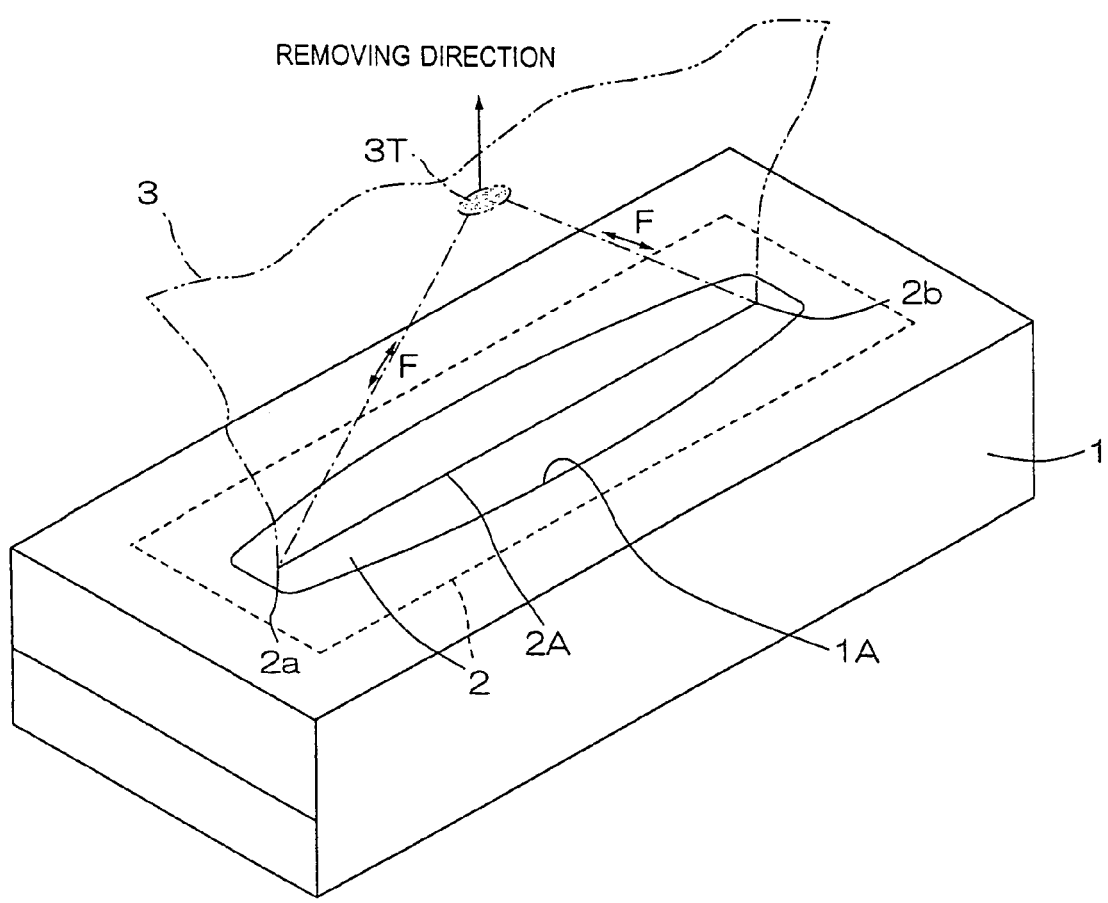
FIG. 1 is a perspective view showing a carton box.

A term "sanitary tissue paper" used herein includes tissue paper and toilet paper. The invention will be described with reference to tissue paper.

A. Embodiments of the Invention for Sanitary Tissue Paper and Packaging

Now, an embodiment of the above noted invention will be described. A direction of paper making flow is defined as a longitudinal direction and a direction which is perpendicular to the direction of paper making flow is defined as a lateral direction. In phase of packing of paper into a carton, a longitudinal direction of the carton is defined as a lateral direction and a direction in a short side is defined as a longitudinal direction. The following embodiment will be described with reference to stacking of two sheets (double plies). The invention is applicable to single-ply. Two hundred sets of double plies (total 400 sheets) are preferable for packing in one carton. The invention will be described with reference to this case.

A-1. An Embodiment of Invention for Sanitary Tissue Paper

The tissue paper of the present embodiment is of single-ply or double plies type and has a tensile strength of 32 N/m or more in a lateral direction on a dry condition and a longitudinal tensile strength of 32 N/m or more (preferably 36 N/m or more) on a wet condition which are measured according to JISP8113.

The longitudinal tensile strength is generally larger than the lateral tensile strength. In order to prevent the tissue paper from being torn when it is removed from a carton with a wet hand, it is important that the lateral tensile strength on a dry condition and longitudinal tensile strength on a wet condition be higher than 32 N/m.

On the other hand, it is preferable that the longitudinal tensile strength on a dry condition be 2.5 to 3.5 times higher, particularly 2.8 to 3.4 times higher than the lateral tensile strength on a dry condition. If the longitudinal tensile strength on a dry condition is increased, the paper has a higher strength although it has a lower flexibility. If the longitudinal tensile strength is decreased, the flexibility is enhanced although the strength is lower. The prior art tissue paper in which such a ratio exceeds 3.5 is dominant. Tissue paper having good and soft touch and enough strength can be obtained by adjusting the parameters so that the longitudinal tensile strength on a dry condition is suppressed while the lateral tensile strength on a dry condition is enhanced in accordance with the invention.

It is preferable that the tissue paper of the embodiment has a basis weight according to JISP8124 of 11.0 g/m² or less for one sheet, more preferably 5.0 to 11.0 g/m², more preferably 8.0 to 11.0 g/m² and a basis weight of 10 to 22 g/m for double plies, more preferably 16.0 to 11.0 g/m². The tissue paper preferably has a density of 0.18 to 0.21 g/cm³ and a thickness of 50 to 60 μm. The thickness is measured according to JISP8111 using a dial thickness gauze "PEACOCK TYPE G" from Ozaki Seisakusho. Specifically, a plunger is placed on a measuring platen after confirming that no foreign material such as dust exists between the plunger and the platen, and then zero adjustment is conducted by moving the dial of the thickness gauze. Then the plunger is lifted so that a sample (tissue paper) is placed on the platen. The plunger is slowly lowered and the gauze is read when the plunger rests on the platen. Each measurement is conducted for one sheet of paper. An average over 10 measurements is calculated.

The tissue paper of the embodiment can be manufactured by a usual process from preferably 100% wood pulp. In this case, the ratio of NBKP to LBKP is 10:90 to 70:30, preferably 50:50 to 93:7, more preferably 65:35 to 69:31. The higher the ratio of NBKP becomes, the higher flexibility can be obtained.

It is preferable to conduct the paper making in such a manner that paper making water flow speed/wire speed (J/W ratio) be 0.92 to 1.00, particularly 0.93 to 1.00. The other paper making parameters may be appropriately changed based upon known technology.

It is preferable to conduct a crepe providing work of the tissue paper of the embodiment of the invention so that the longitudinal elongation of the tissue paper is 7 to 20%, preferably 7 to 13% and so that the number of crepes in a low direction is 30 to 50/cm. To this end, the crepe rate is preferably 10 to 28%.

column of Table 1 was measured by the measuring methods which are described in the detailed description. The elongation ratio was obtained as follows: Five sheets of sample paper were stacked and sheared using a shearing machine so that the width of the sample in a longitudinal direction was 25 mm. Then, the length of the sample was measured using a load cell tensile test machine (TG-200N manufactured by Minebea K.K.) when the sample was torn at a grabbing spacing of 100 2 mm and pulling speed of 50 mm/min. The elongation ratio was calculated in accordance with a formula as follows:

$$\text{elongation ratio (\%)} = \frac{\text{the length on tearing (mm)} - 100 \text{ mm}}{100 \text{ mm}} \times 100 \quad (1)$$

TABLE 1

|  |  | Example 1 | Example 2 | Control 1 | Control 2 |
|---|---|---|---|---|---|
| Conditions | Basis weight (g/m$^2$) | 10.8 | 11.0 | 11.9 | 11.3 |
|  | Thickness (μm) | 56 | 55 | 71 | 51.5 |
|  | Density (g/cm$^3$) | 0.19 | 0.20 | 0.17 | 0.22 |
|  | Longitudinal tensile strength on a dry condition (N/m) | 124.4 | 132.0 | 160.0 | 121.2 |
|  | Lateral tensile strength on a dry condition (N/m) | 41.6 | 44.0 | 40.0 | 43.6 |
|  | Ratio of longitudinal to lateral tensile strength on a dry condition | 2.99 | 3.00 | 4.00 | 2.78 |
|  | Lateral tensile strength on a wet condition | 36.4 | 36.0 | 4.0 | 30.0 |
|  | NBKP:LBKP | 46:54 | 37:63 | 43:57 | 47:53 |
|  | J/W ratio on paper making | 0.94 | 0.95 | 0.91 | — |
|  | Elongation (%) | 8.0 | 9.0 | 9.0 | 7.9 |
| Evaluation | Softness | 3.9 | 3.9 | 2.7 | 3.2 |
|  | Smoothness | 3.9 | 3.9 | 2.7 | 2.9 |
|  | Thickness feeling | 3.2 | 3.3 | 3.3 | 3.1 |

It is preferably to pack the tissue paper having a crepe rate of 10 to 28% in a carton so that the apparent density is 0.10 to 0.20 g/cm$^3$. Accommodation of the tissue paper within the carton box can be enhanced by making the density 0.10 g/cm$^3$ or more. Tearing of the tissue paper on removal can be prevented by making the density 0.20 g/cm$^3$ or less.

The tissue paper of the embodiment can be suitably packed in a carton having a low height, such as a carton having a height of 50±2 mm which is converted from the height of conventional carbon of 65 mm. In this case it is preferable to pack the tissue paper in such a manner that the removing direction for use is said lateral direction.

Trading between the flexibility and the strength can be achieved by conforming the above-mentioned requirements of the present invention. The tissue paper can be made 10 preferable that it is accommodated in a carton box having a height of 50±2 mm by making the thickness of paper 50 to 60 μm. The carton box having a form which will be described will be preferably used as the carton box which is preferable for the sanitary tissue paper of the present invention.

EXAMPLE

The results of evaluation on the softness, smoothness and thickness feeling of the examples of the present invention and controls are shown in Table 1. The longitudinal and lateral tensile strength, thickness and basis weight set forth in the softness: A value representative of the softness in table is an average of the values which 30 persons gave on a scale of for the feeling of examples and controls.

Smoothness: A value representative of the smoothness in table is an average of the values which 30 persons gave on a scale of 5 for the feeling of examples and controls.

Thickness feeling: A value representative of the thickness feeling in table is an average of the values which 30 persons gave on a scale of 5 for the feeling of examples and controls.

It is found from Table 1 that examples 1 and 2 of the present invention are highly evaluated in the feeling test of softness, smoothness and thickness feeling.

A-2. An Embodiment of the Inventions for Sanitary Tissue Paper Packaging

The carton 1 of the tissue paper of the present invention is formed with a window 1A in the top face of the carton 1a as shown in FIG. 1. The window 1A is covered on the inner side thereof with a sheet 2 having a slit 2A. A sheet of tissue paper can be successively removed from the carton through the slit 2A. The window 1A can be formed by removing a strip encircled by perforations preliminarily formed in the top face of the carton in a known manner.

The sheet 2 is larger in size than the window 1A and in the form of, for example, rectangular as shown in the drawing and is bonded to the inner side of the top of the carton with an adhesive. In the embodiment, the sheet 2 comprises a polyethylene sheet. In lieu of this, a sheet of synthetic paper having a basis weight of 10 to 35 g/m² in which synthetic fibers or chemical fibers are blended, or of unwoven fabric may be used. The synthetic or chemical fibers may preferably include rayon, acetate, vinyl acetate fibers. If recycling of the material is neglected to some extent, polyethylene, polypropylene, polyester fibers may be used. The unwoven fabric may include air-through, point bond, melt blow and spun bond unwoven fabrics from the view of point of form. The material of the unwoven fabric may include polyethylene, polypropylene, polyester, and pulp. If the basis weight is less than 10 g/m², then the strength is insufficient so that the probability of tearing or breaking on removal of the tissue paper 3 becomes higher. If the basis weight exceeds 35 g/m², no problem of strength occurs while the cost and noise on removal of the paper tend to become higher.

The sheet 2 is formed with a slit 2A so that the slit is aligned with the center of the width direction of the window 1A (longitudinal direction of the carton 1, lateral direction of the tissue paper 3) when the sheet 2 is bonded to the top of the carbon 1 on the inner side thereof. The length of the slit 2A is preferably shorter than the full length of the window 1A in the longitudinal direction thereof as shown at (a) in FIG. 2. It may be equal to the full length of the window 1A in a longitudinal direction thereof as shown at (c) in FIG. 2. Alternatively it may be shorter than the latter provided that it is shorter than the lateral length of the sheet 2 as shown at (c) in FIG. 2.

In this meaning, the possible length L of the slit 2A (the possible length L is the full length of the slit 2A in cases of (a) and (b) in FIG. 2 and is the full length of the window 1A in case of (c) in FIG. 2) is 72 to 90% of the lateral length 3a of the tissue paper 3, more preferably 76 to 38% in accordance with the present invention.

For currently commercially available compact type tissue paper, the sanitary tissue paper has a longitudinal size of 197 mm and a lateral size of 229 mm and the carton has a length of 240 mm, a width of 115 mm and a height of 65 mm. The slit is usually formed into the shape as represented at (a) in FIG. 2. The length of the slit is about 160 mm. The effective length of the slit is about 70% of the lateral length of the tissue paper.

The tissue paper is usually of double-plies. The sheets of the tissue paper are folded and stacked by an interfolder so that subsequent sheet of tissue paper projects from and through the slit when preceding unit sheet of the tissue paper has been removed therefrom.

Figure 3:
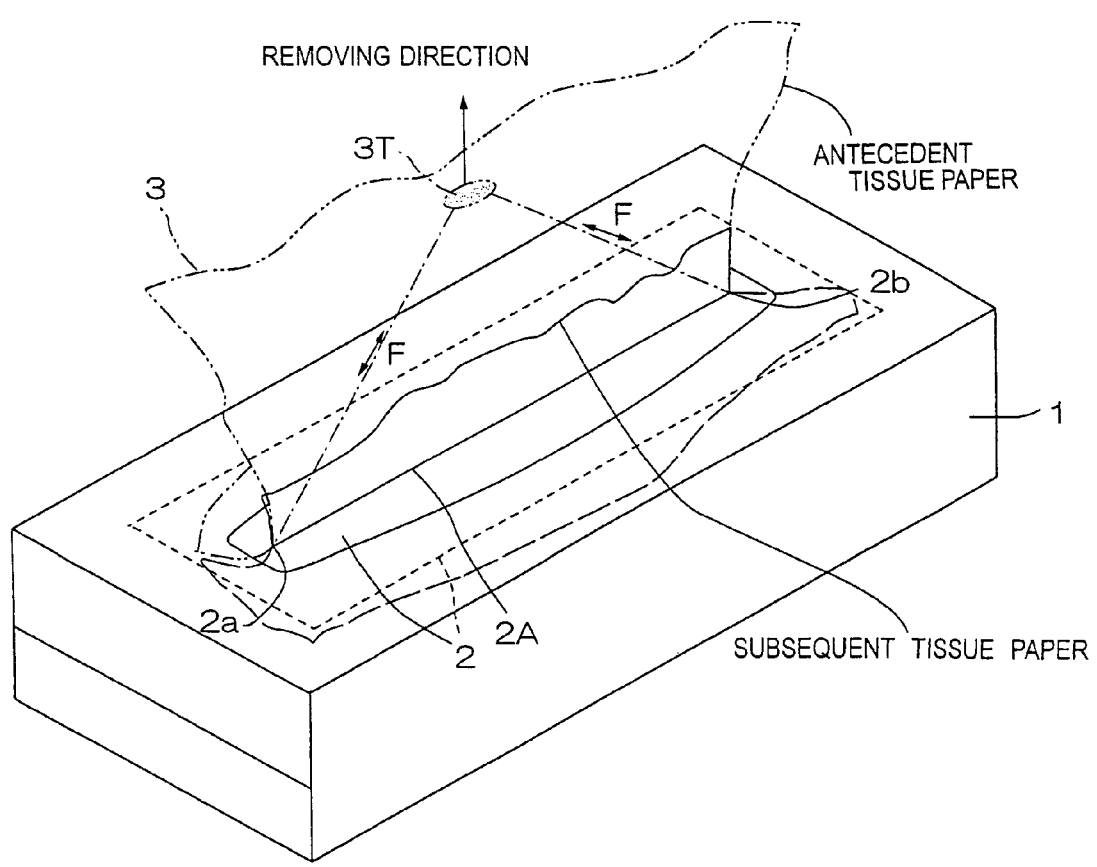
FIG. 3 is a perspective view showing the relation between the slit ends and tissue paper sheet.

In order to remove a sheet of the tissue paper 3 from the carton 1, it is lift up by tweezing a tweezing portion 3T in the midposition of the paper in the vicinity of the side edge of the tissue paper 3. At this time, the lateral end portions of the tissue paper gradually approach toward the opposite ends of the slit 2A in association with the lifting up. Since lifting operation is carried out while approaching tissue paper portions are in a frictional contact with the opposite ends 2a, 2b of the slit 2A, pulling forces F, F intensively act on a portion between the tweezing portion 3T and the opposite ends 2a, 2b of the slit 2A of the tissue paper which is currently raised. In a later phase of the removing operation a force is necessary to raise the subsequent sheet of the tissue paper due to mentioned folded stacking of the paper as schematically shown in FIG. 3. Such an additional force is added. Supplementarily describing the pulling force acting upon the tissue paper, the force in the leading half phase of removing operation includes a force X (a force to move the lateral ends of the issue paper toward the opposite ends of the slit 2A including a force to separate the leading paper from the subsequent paper against the friction therebetween) plus a force Y (a force to lift up the tissue paper 3 against the friction with the opposite ends 2a, 2b of the slit 2A). In the latter half phase, a force Z (a force to lift the subsequent tissue which is associated with the leading paper due to folded stack) is further added to X plus Y.

Figure 4:
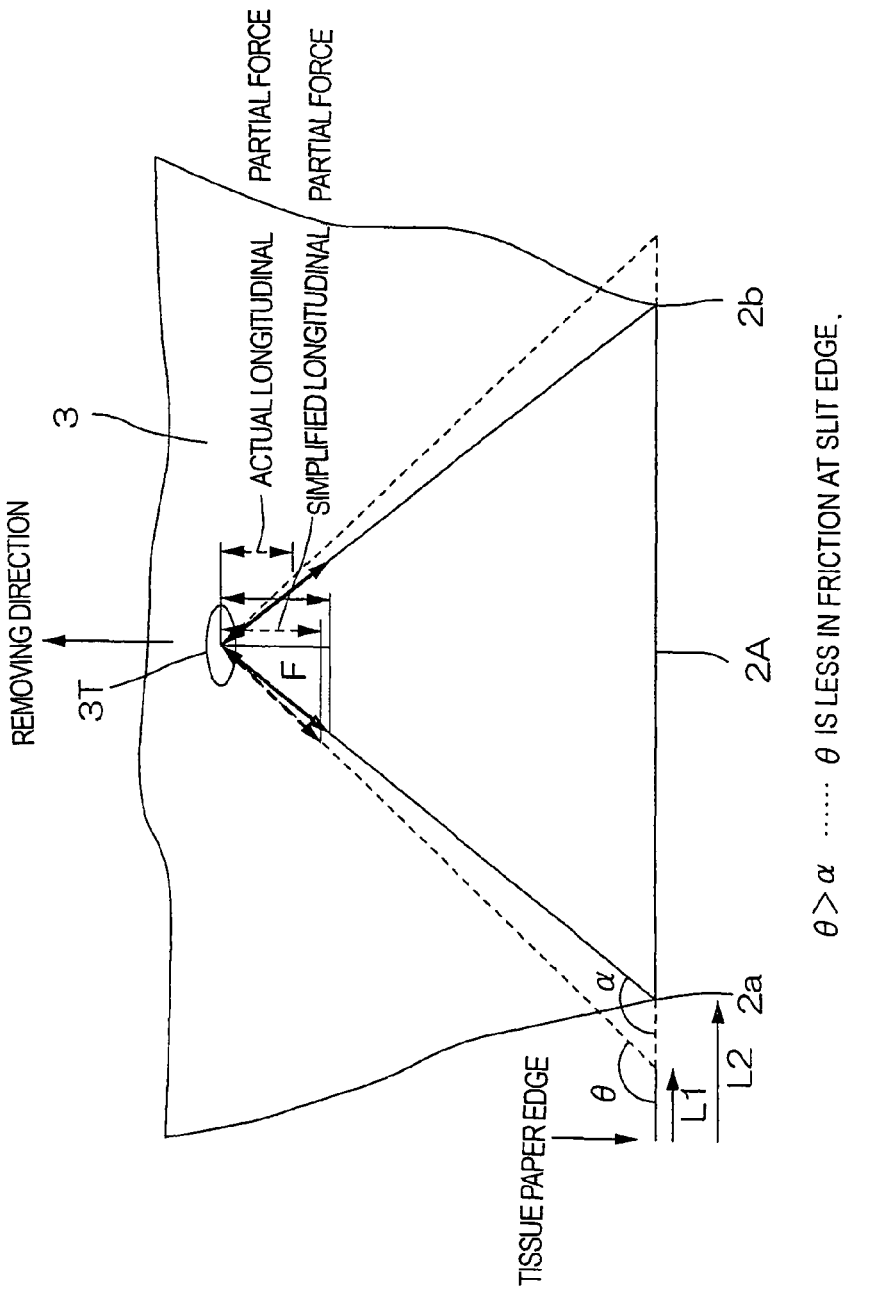
FIG. 4 is a schematic view explaining the action of forces.

The pulling force F acting upon the portion between the tweezing portion 3T and the opposite ends 2a, 2b of the slit 2A also act as a force for tearing the tissue paper 3 in a lateral direction. If the possible length L of the slit 2A is increased, the partial longitudinal force acting upon the tissue paper is less even assuming equal pulling forces F as schematically shown FIG. 4. Accordingly, the lateral tearing force on the tissue paper 3 is low. Furthermore, in effect, the force Y (a force to lift the tissue paper 3 against the friction with the opposite ends 2a, 2b of the slit 2A) is also low.

Accordingly, if the possible length L of the slit 2A is 72 to 90% of the lateral length 3a of the tissue paper 3 even in case where the force Z is added, normal pulling operation will not cause the paper to be torn. Although it seems that there is no significant numerical difference between the 72% which is a lower limit and 70%, there is a distinct difference if the height of the carton is made low (45 mm to 55 mm).

If the height of the carton is to be changed from 65 mm to, for example 50±2 mm as mentioned above, the basis weight of the tissue paper should be made lower. Since the basis weight of the tissue paper has a lower limit for assuring a necessary strength, a higher force is applied to the packed three sheets of tissue paper. As a result, the above-mentioned forces X and Y becomes larger so that tearing of the tissue paper is liable to occur.

From the view point of this, the lateral tensile strength should be increased. Since tearing is liable to occur when the paper is pulled up with a wet hand, improvements to provide the lateral tensile strength on a wet condition of 32 N/m or more and to make the effective length of the slit 72 to 90% of the lateral length of the tissue paper has a special significance.

The reason why the upper limit is 90% resides in that the accommodation of the packed tissue paper is made stable and in that the sheet 2 should be bonded to the top face of the carton 1. It is preferable to make the area of the window 1A 70 cm² or more particularly in case where the area of the tissue paper 3 is made 420 cm² or more.

Although the tissue paper which is packed in the carton box can be manufactured by a usual method, the relation between the preferable example and the tissue carton will be described as follows:

It is preferable that the tissue paper to be packed in the above-mentioned carton consists of 100% wood pulp. In this case, the ratio of NBKP:LBKP is preferably 10:90 to 70:30, more preferably 35:65 to 50:50. The higher the ratio of NBKP becomes, the more flexibility can be obtained.

The tissue paper of the present embodiment preferably has a basis weight of 10 to 22 g/m² based upon JISP8124 and a lateral tensile strength of 32 N/m or more (more preferably 34 N/m or more) based on JISP8113. Trading between the flexibility and the strength can be achieved by making the basis weight of the double-plies 10 to 22 g/m², more preferably 11.0 to 16.0 g/m² (5.0 to 11.0 g/m² for single-ply, more preferably 8.0 to 11.0 g/m²). By making the lateral tensile strength on a wet condition 32 N/m or more (preferably 34 N/m), the strength can be improved, particularly tissue paper can be prevented from being torn on removal thereof.

It is preferable that the longitudinal tensile strength on a dry condition of the tissue paper based upon the JISP8113 is 1.5 to 4.0 times, particularly 2.0 to 3.5 times as large as the lateral tensile strength on a dry condition. If the longitudinal tensile strength on a dry condition is increased, the strength is increased while the flexibility is lowered. Heretofore, the tissue paper in which the ratio exceeds 4.0 times has been predominant. In accordance with the present invention, the tissue paper providing excellent and soft touch and enough strength can be obtained by suppressing the longitudinal tensile strength on a wet condition and increasing the lateral tensile strength on a dry condition.

It is preferable to conduct crepe working of the tissue paper of the present embodiment in such a manner that the longitudinal elongation of the tissue paper is 7 to 20%, more preferably 7 to 13%, the number of the crepes 30 to 55/cm, and the crepe ratio is 10 to 28%.

It is preferable to pack the tissue paper having a crepe ratio of 10 to 28% in a carton so that it has an apparent density of 0.10 to 0.20 g/cm$^3$. The accommodation of the tissue paper in the carton can be made better by making the density 0.10 g/cm$^3$ or more. Tearing on removal can be prevented by making the density 0.20 g/cm$^3$ or less. When the longitudinal tensile strength on a wet condition is 160 N/m or less, particularly 140 N/m or less, it is particularly preferable that the recovery ratio of the sanitary tissue paper which is left to stand at 60° C. becomes 20% or less.

Example 1

The tissue paper was checked for whether or not there is tearing or breaking of the paper on removal of the paper from the carton which has been described as the embodiment and for the flexibility of the removed tissue paper. The carton was 243 mm in length, 115 mm in width and 65 mm in height. The slit was in the form which is shown at (a) in FIG. 2 and had a length of 165 mm (about 72% of the lateral length of the tissue paper). The tissue paper was 197 mm in the longitudinal length, and 229 mm in the lateral size. One sheet of the tissue paper had a basis weight of 12.0 g/m$^2$, the lateral tensile strength on a wet condition of 32 N/m, the ratio of the longitudinal tensile strength of on a dry condition to the lateral tensile strength on a wet condition (slenderness ratio) of 4, and a longitudinal elongation of 9%. Two hundred sets of double-plies, that is, total 400 sheets of the tissue paper was packed in a carton. Evaluation was conducted as follows:

The number of torn sheets: After stripping a portion which is encircled by perforations on the upper face of the carton, 2 sets of sheets of the tissue paper were pulled out from the carton. Thereafter, 30 sets of tissue paper sheets were successively pulled out. The number of torn sheets of 30 sets of tissue paper sheets was counted. Thirty persons conducted the test by the same method. The averaged count was determined as the number of torn tissue paper sheets.

Flexibility: The tissue paper sheet which was qualified as bad by 5 or more persons of 30 users is represented by a mark X.

Examples 2 to 5 and Controls 1, 2

The tissue paper of examples 2 to 5 and controls 1, 2 was provided by changing the effective length of the slit, height of the carton, the lateral tensile strength on a wet condition and the slenderness ratio. The apparent density of the tissue paper when the carton has a height of 50 mm was 0.20 g/cm$^3$. The results of evaluation were shown in Table 2.

TABLE 2

|  | Effective length of slit (mm) | Carton height (mm) | Lateral tensile strength on a wet condition (N/m) | Ratio of longitudinal to lateral tensile strength | Number of torn sheets | Flexibility |
|---|---|---|---|---|---|---|
| Example 1 | 165 | 65 | 32 | 4.0 | 0 | ○ |
| Example 2 | 165 | 65 | 28 | 4.0 | 0 | ○ |
| Example 3 | 165 | 50 | 32 | 4.0 | 0 | ○ |
| Example 4 | 165 | 50 | 32 | 4.5 | 0 | x |
| Example 5 | 165 | 50 | 28 | 4.0 | 0 | ○ |
| Control 1 | 160 | 65 | 32 | 4.0 | 3 | ○ |
| Control 2 | 160 | 50 | 32 | 4.0 | 7 | ○ |

(* effective length of slit: about 72% and 70% in case of 165 mm and 160 mm, respectively)

It was found that if the effective length of the slit was 72%, the number of tissue paper sheets which were torn on removal is decreased and that this effect was remarkable if the height of the carton is low (50 mm). It was found that the slenderness which is 4.0 or less provides an excellent flexibility.

Example 6

The tissue paper of example 6 was provided by packing the tissue paper in which the longitudinal tensile strength of the tissue paper of example 3 having a slenderness of 4.0 was changed into 160 N/m and the basis weight and the longitudinal elongation was adjusted so that the recovery ratio of the tissue paper bundle which was left to stand at 60° C. be 20%.

Controls 3 and 4 controls 3 and 4 were provided by changing the longitudinal tensile strength and recovery in example 6. Evaluation results are shown in Table 3.

TABLE 3

|  | Example 6 | Control 3 | Control 4 |
|---|---|---|---|
| Longitudinal tensile strength on a dry condition (N/m) | 160 | 160 | 180 |
| Recovery ratio (%) | 20 | 25 | 20 |
| Number of torn sheets | 0 | 6 | 0 |
| Flexibility | ○ | ○ | x |

B. An Embodiment of Inventions for an Interfolder

Now, an embodiment of the above noted invention will be described in detail with reference to sanitary tissue paper.

(An Example of Interfolder)

Figure 5:
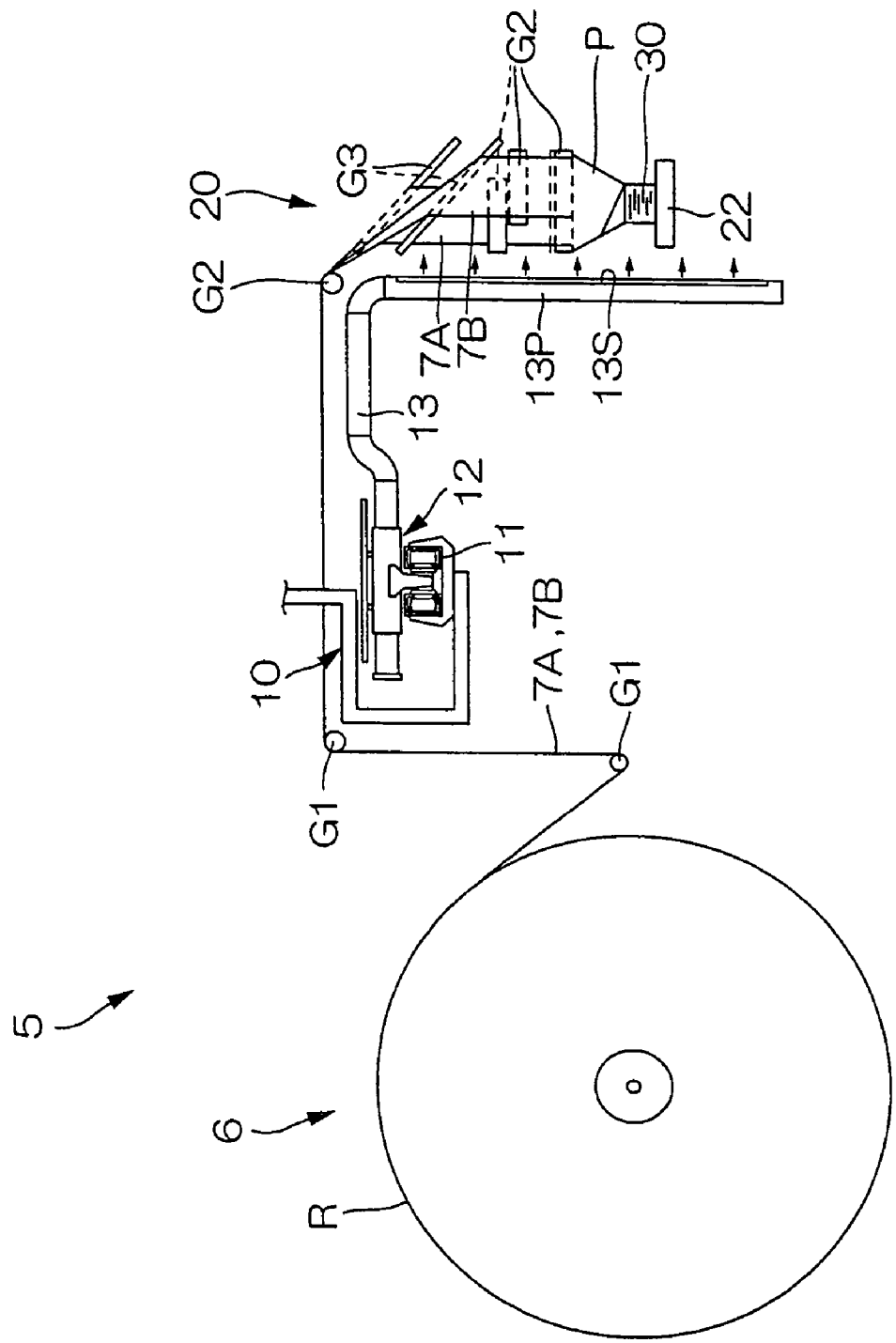
FIG. 5 is an elevational view showing an interfolder.

FIG. 5 shows a folded board type interfolder 5 which is provided by the present invention. A reference R in the drawing represents a paper roll which is mounted on a paper roll support 6 of the interfolder 5. A necessary number of paper rolls R are juxtaposed in a direction perpendicular to the paper of the drawing. In this case, the paper rolls R are provided by dividing a paper sheet into webs each having a product width and by rolling them at a width which is several times of a product width, for example, double width.

Continuous sheets 7A, 7B (hereinafter referred to as "sheets") which are dispensed from the paper roll R are transported into a folding mechanism 20 via guide rollers G1, G2.

Figure 6:
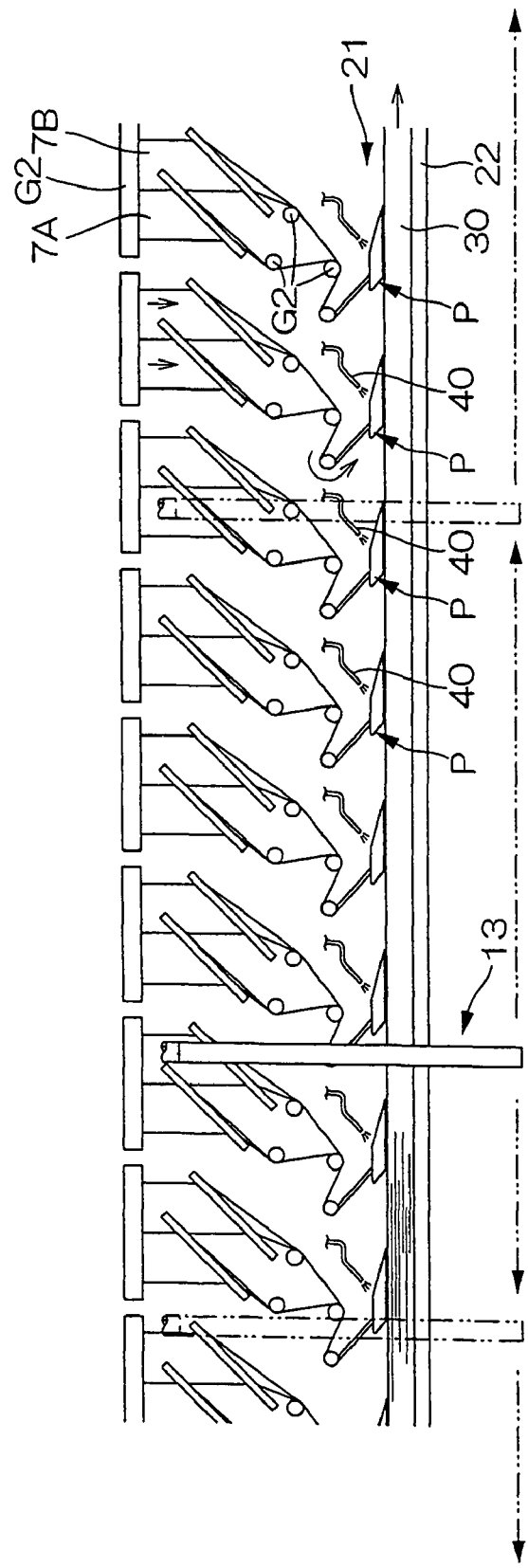
FIG. 6 is a front view showing a folding mechanism.

The folding mechanism 20 is formed with a folding board bank 21 comprising a necessary number of folding boards P, P . . . which are juxtaposed with each other as shown in FIG. 6. Guide rollers G2, G2 and guide round members G3, G3 are disposed in appropriate positions for guiding a pair of sheets 7A, 7B to folding boards. Conveyers 22 for receiving and transporting folded and stacked sheets 30 are disposed below the folding boards P, P . . . .

The folding mechanism using such folding boards P, P, . . . has been known from, for example U.S. Pat. No. 4,052,048. They are usually referred to as "folding boards". Each of sheets 7A, 7B is folded in a "Z" manner and is stacked while the side edges of the adjacent sheets 7A, 7B are overlapped.

Figure 7:
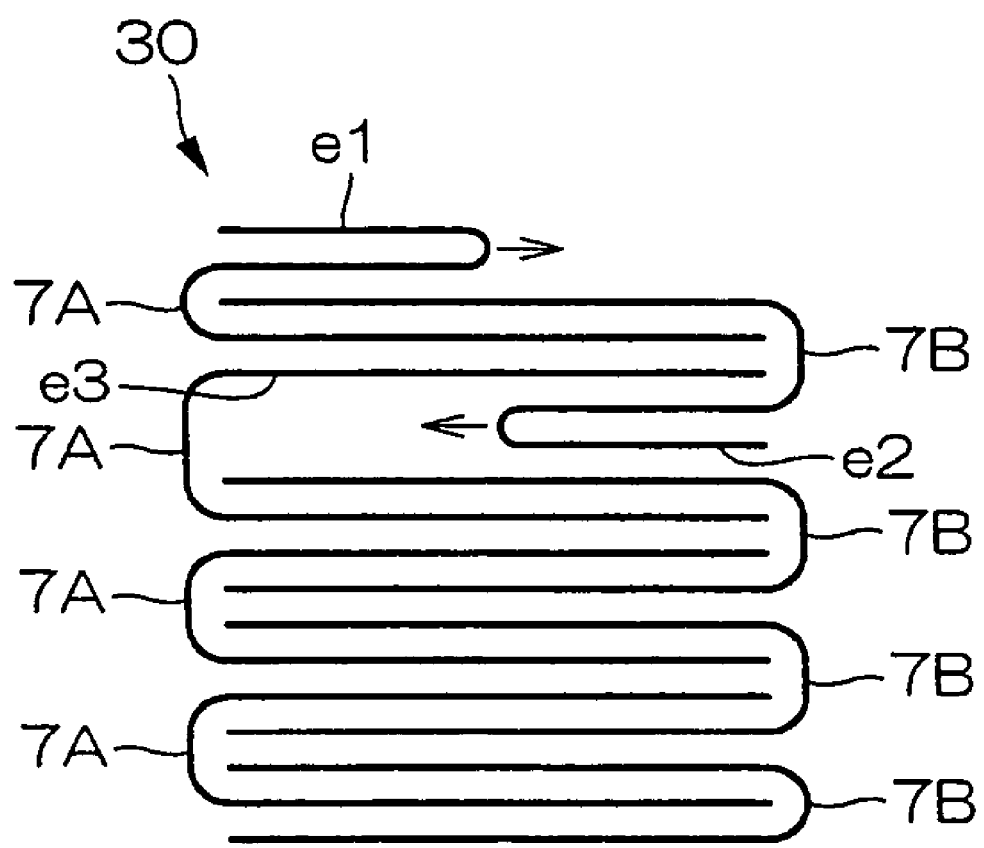
FIG. 7 is a longitudinal sectional view showing a folding way.
Figure 8:
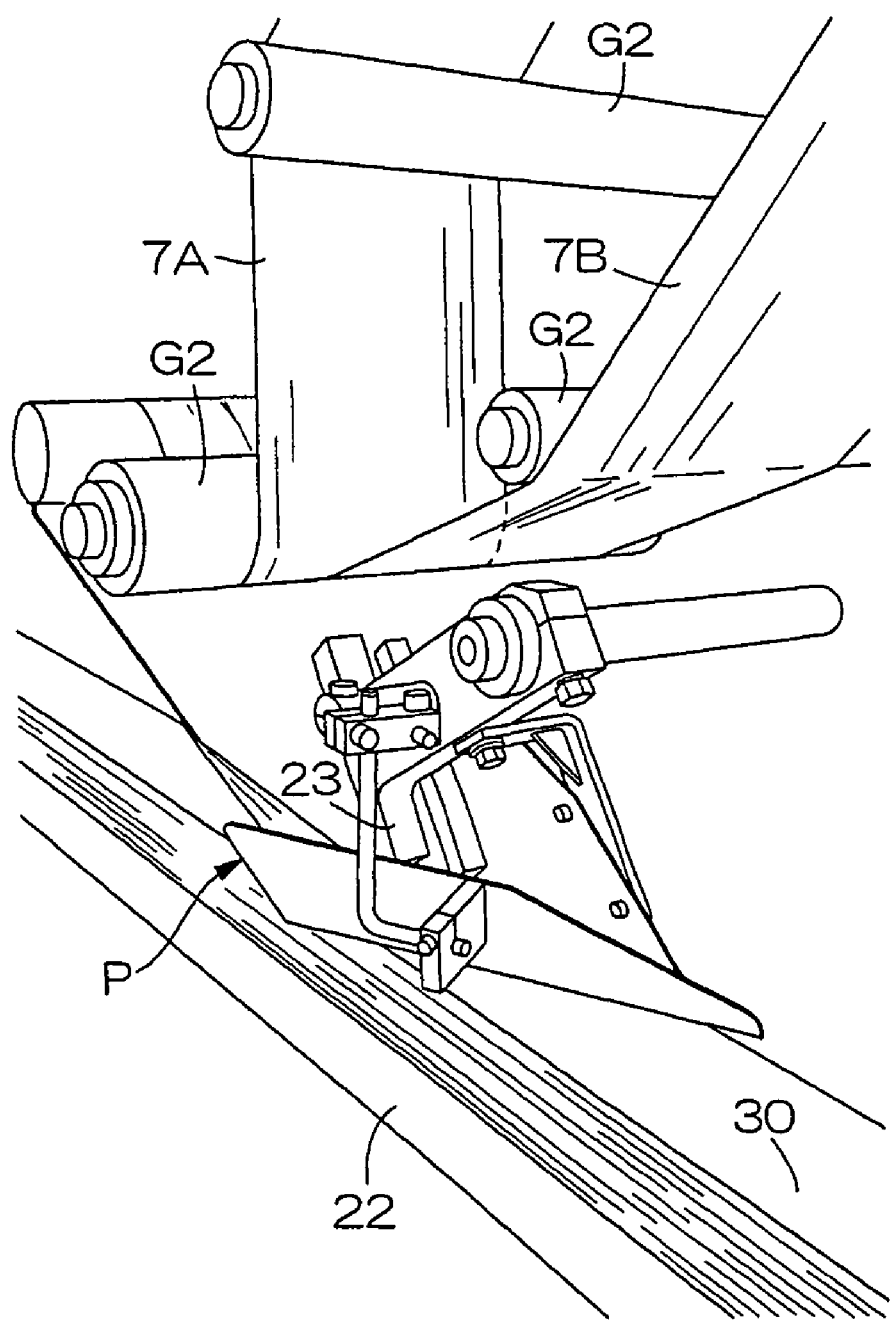
FIG. 8 is an enlarged schematic view showing a main part of a folding board.
Figure 9:
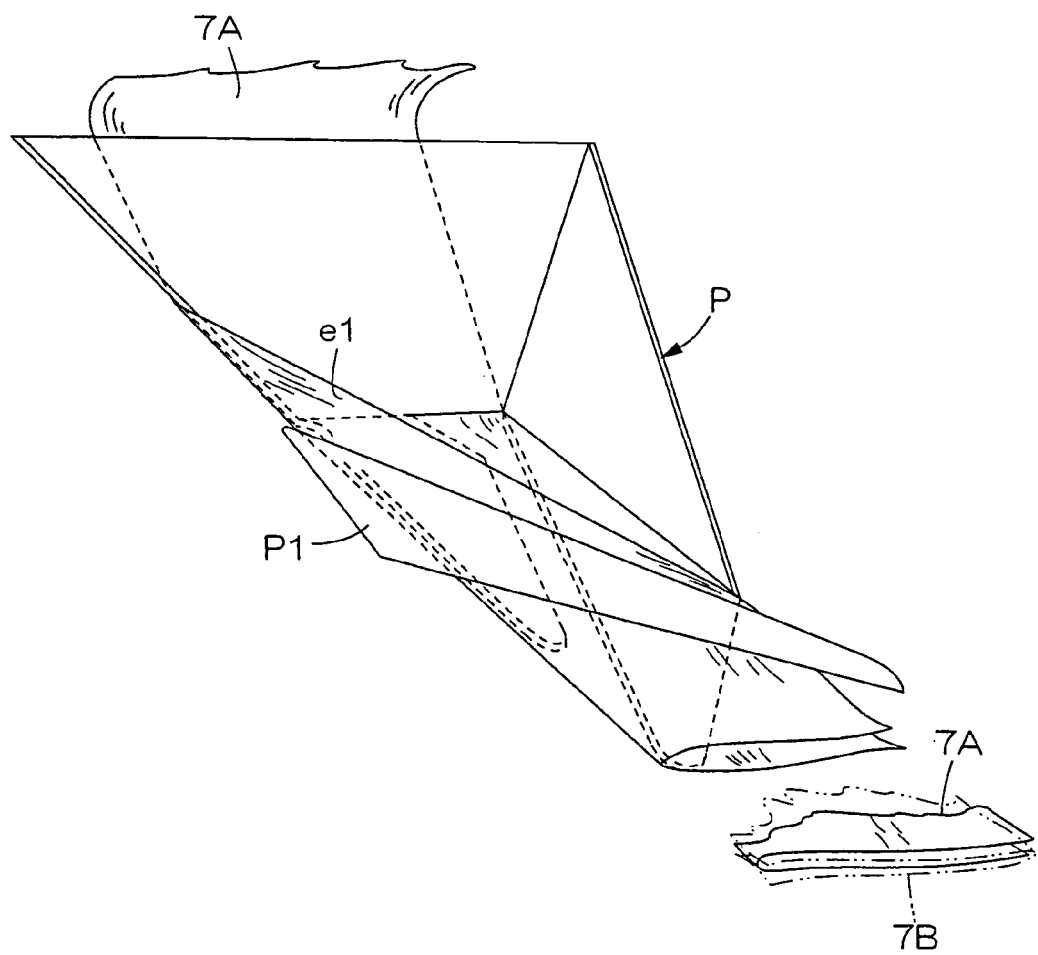
FIG. 9 is an enlarged schematic view showing a folding way.
Figure 10:
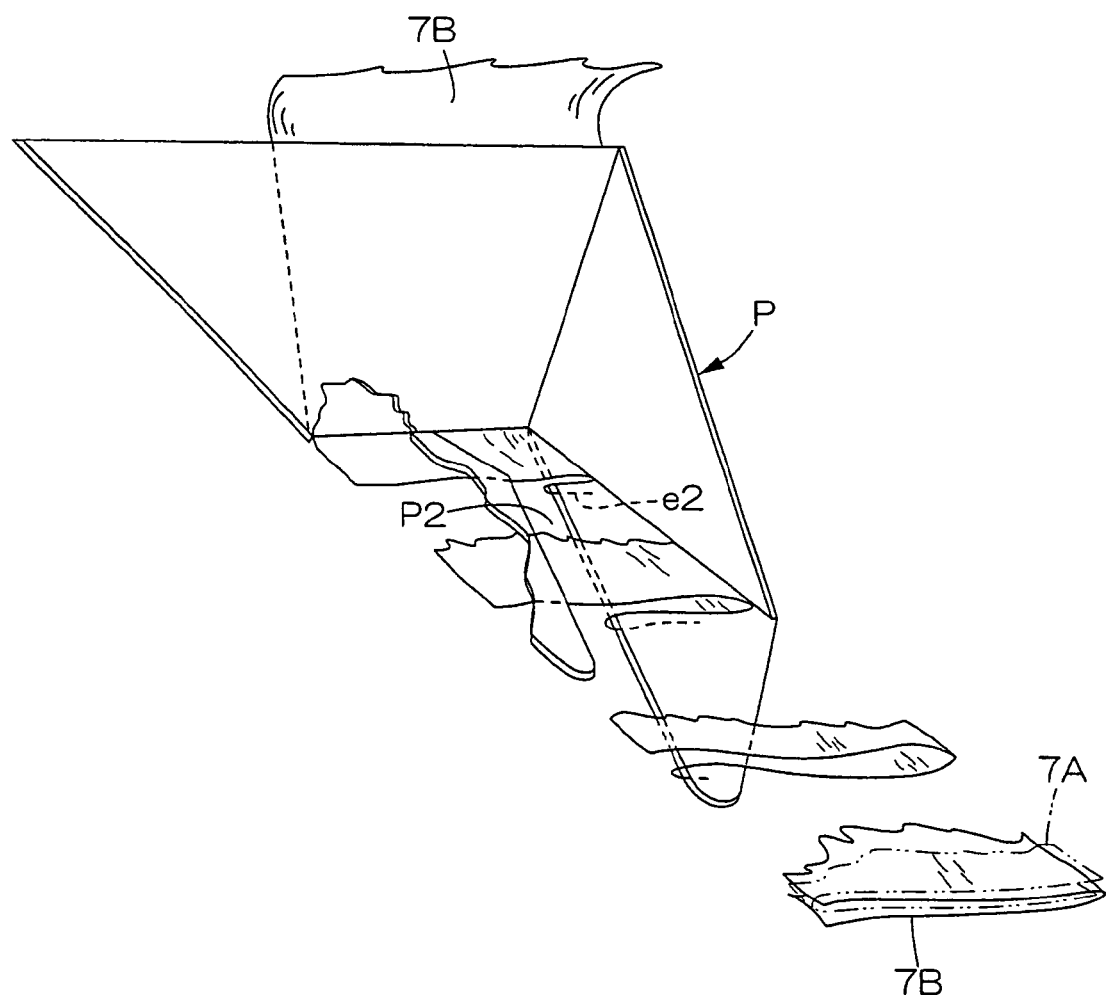
FIG. 10 is an enlarged schematic view showing a folding way.
Figure 12:
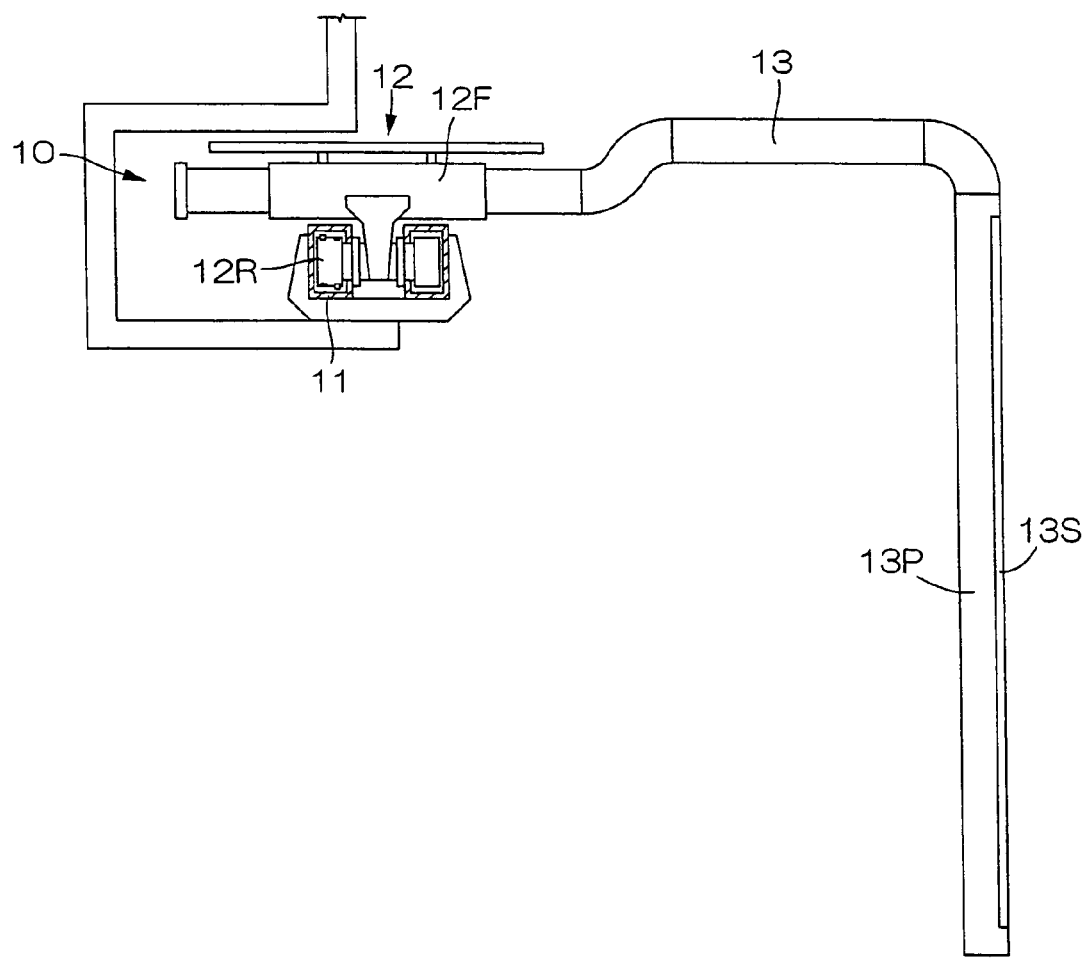
FIG. 12 is an elevational view showing a part of movable air blowing means.

The relationship between the folding boards of the folding machine and the sheets is illustrated in FIGS. 8 to 11. Briefly describing it, a pair of sheets 7A, 7B are guided to each folding board P as shown in FIGS. 8 to 11. At this time, the sheets 7A, 7B are guided while they are offset in position so that the side edges are overlapped by a guide round bar member G3. A sheet having its side edge which is below the side edge of the other folding board when it has been guided to the folding board is referred to as "first sheet 7A". A sheet having its side edge which is on the side edge of the other sheet 7A is referred to as "second sheet 7B". The side edge e1 of the first sheet 7A which is not overlapped on the second sheet 7B is folded on the upper side of the second sheet 7B by a side board P1 of the folding board as shown in FIGS. 7 and 9. The side edge e2 of the second sheet 7B which is not overlapped on the first sheet 7A is folded downward so that it is pulled on the folding board from a slit P2 of the folding board P as shown in FIGS. 7 and 10. At this time, the folded edge e3 which is the upper most ply of the folded and stacked sheet 7A on the upstream folding board P is guided into a space between the folded portions of the second sheet 7B from the slit P2 of the folding board P as shown in FIGS. 7 and 11. Thus, the sheets 7A, 7B are folded in a Z-shape manner and the side edges of the adjacent sheets 7A, 7B are engaged. When the upper most sheet of tissue paper is pulled up for use, subsequent sheet of tissue paper partially projects from the carton.

The folded stack 30 which is manufactured in such a manner is cut at predetermined intervals in a longitudinal direction, packed in cartons and packaged to provide tissue paper products.

(Present Invention)

In accordance with the present invention, such an interfolder is provided with movable air blowing means for blowing air toward at least the folding boards while moving in the vicinity of the folding boards.

Figure 13:
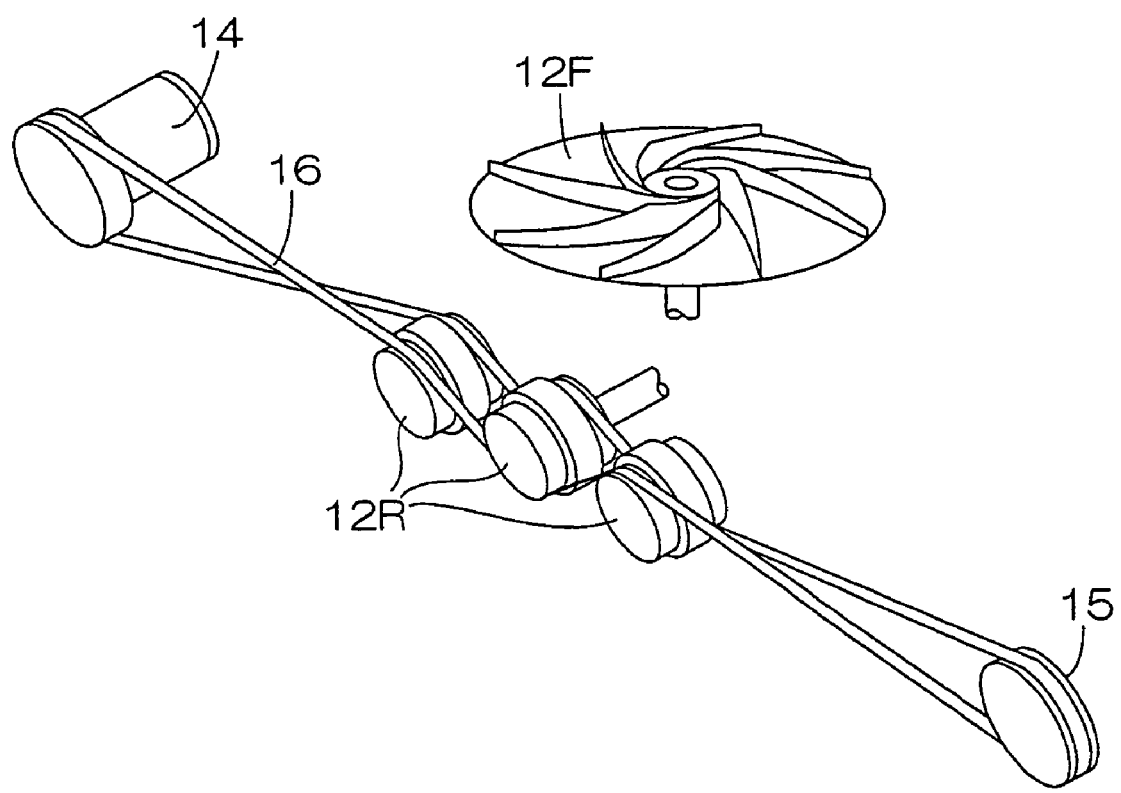
FIG. 13 is a schematic view showing a movable mechanism of the movable air blowing means.

Specifically it is recommended that the movable air blowing means 10 is provided which extends from the upper portion of a space between the paper roll support 6 and folding mechanism 20 to the folding mechanism 20 in such a manner that it is suspended as shown in FIG. 5. That is, guide rails 11 are secured in a juxtaposing direction of the folding boards P and a base unit 12 which reciprocates along the guide rails 11 is provided. The base unit 12 comprises a fan 12F and drive rollers 12R which travel on the rails 11. The drive power of the drive rollers 12R is transmitted to the fan 12F via power transmission such as gears (not shown) for driving the fan 12F. A drive motor 14 is provided on the side of one end of the guide rail 11 as a drive power source as shown in FIG. 13. A return pulley 15 is provided on the other side. An endless drive belt 16 is tensioned on and around the drive motor 14 and the return pulley 15 and is also tensioned on the drive roller 12R of the base unit 12. When the drive motor 14 is rotated in a normal or reverse direction in such an arrangement, the rotational power is transmitted to the drive roller 12R via the endless drive belt so that the base unit 12 can be reciprocally moved in a direction in which the folding boards 9 are juxtaposed and simultaneously the fan 12F can be driven by the rotational power of the drive roller 12R.

An air duct 13 is connected to the exit of the fan 12F of the base unit 12. The air duct 13 is suspended by the base unit 12. The other end of the air duct 13 is formed so that it has a communicating portion 13P passing through the vicinity of the folding board bank in an upward and downward directions. The communicating portion 13P is formed on the side facing to the folding boards P with air blowing slits 13S extending along the communicating portion 13P (at least in the range of level corresponding to the folding boards P).

Thus, air is blown toward the folding boards P and its vicinity from the air blowing slit 13S while the movable air blowing means 10 is reciprocated in a direction in which the folding boards P are juxtaposed as the same manner of the moving condition of the air duct 13 shown in FIG. 6. Air can be uniformly blown upon the folding boards P so that paper particles deposited on the folding board can be uniformly blown away. The blown paper particles are collected by a paper particle collecting apparatus (not shown) which is disposed in the vicinity of the interfolder 1.

On the other hand, in accordance with the present invention, it is preferable to provide fixed air blowing means for blowing air each folding board in a predetermined direction (corresponding to a nozzle 40 in FIG. 6) in addition to the movable air blowing means 10. The fixed air blowing means 40 is preferably provided so that it aims at a position where the paper particles are liable to be deposited or at a position to which air can not be blown by the movable air blowing means 10 (for example, positions around the supporting member 23 of the folding boards P or at corners which are shown in FIG. 8). In this case, one or a plurality of fixed air blowing means 40 may be provided for each folding board P. The residual paper particles which can not be removed by the fixed air blowing means 40 can be removed by the uniform air blowing from the movable air blowing means 10 if the fixed air blowing means 40 is combined with the movable air blowing means 10.

The interfolder may be configured in such a manner that air blowing is successively conducted toward all folding boards P, P, . . . of the bank 21 by only one movable air blowing means 10 as shown in FIG. 2 if the fixed air blowing means 40 is combined with movable air blowing means 10, or the paper particles deposited on the folding board P is less in amount. This allows the facility cost and running cost to be minimized. A plurality of movable air blowing means 10 may be provided for each of a plurality of folding boards P of the bank 21, or a plurality of movable air blowing means 10 are provided for each of the folding boards P, P . . . (not shown).

(Other Features)

The present invention is not limited to the illustrated interfolder, but is applicable to any other interfolders if they use folding bards. For example, the present invention is applicable to an interfolder in which a paper roll having the same width as that of the product tissue paper, or an interfolder in which a paper roll having the width which is double of that of the product tissue paper is split into continuous sheets each having the same width as that of the product tissue by a slit provided on the interfolder prior to folding, and any known interfolder.

C. An Embodiment of the Inventions for an Interfolder

Now, an embodiment of the above noted invention will be described in detail with reference to sanitary tissue paper.

(Examples of Interfolder and Ply-Machine)

Figure 16:
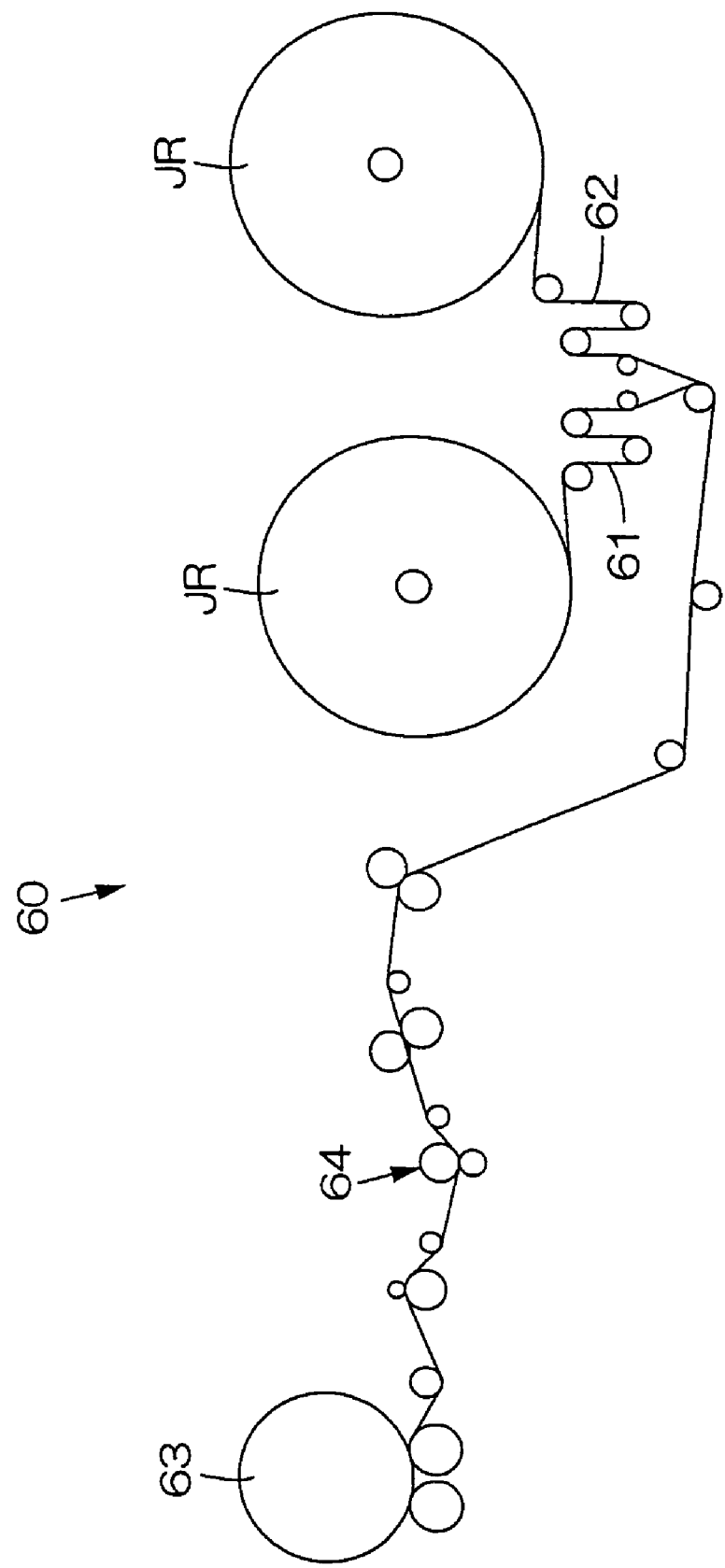
FIG. 16 is a schematic view showing a prior art ply-machine.

The above-mentioned folding board type interfolder is preferably used. A ply-machine shown in FIG. 16 from which an emboss roll 64 is omitted is preferably used.

(Present Invention)

Figure 14:
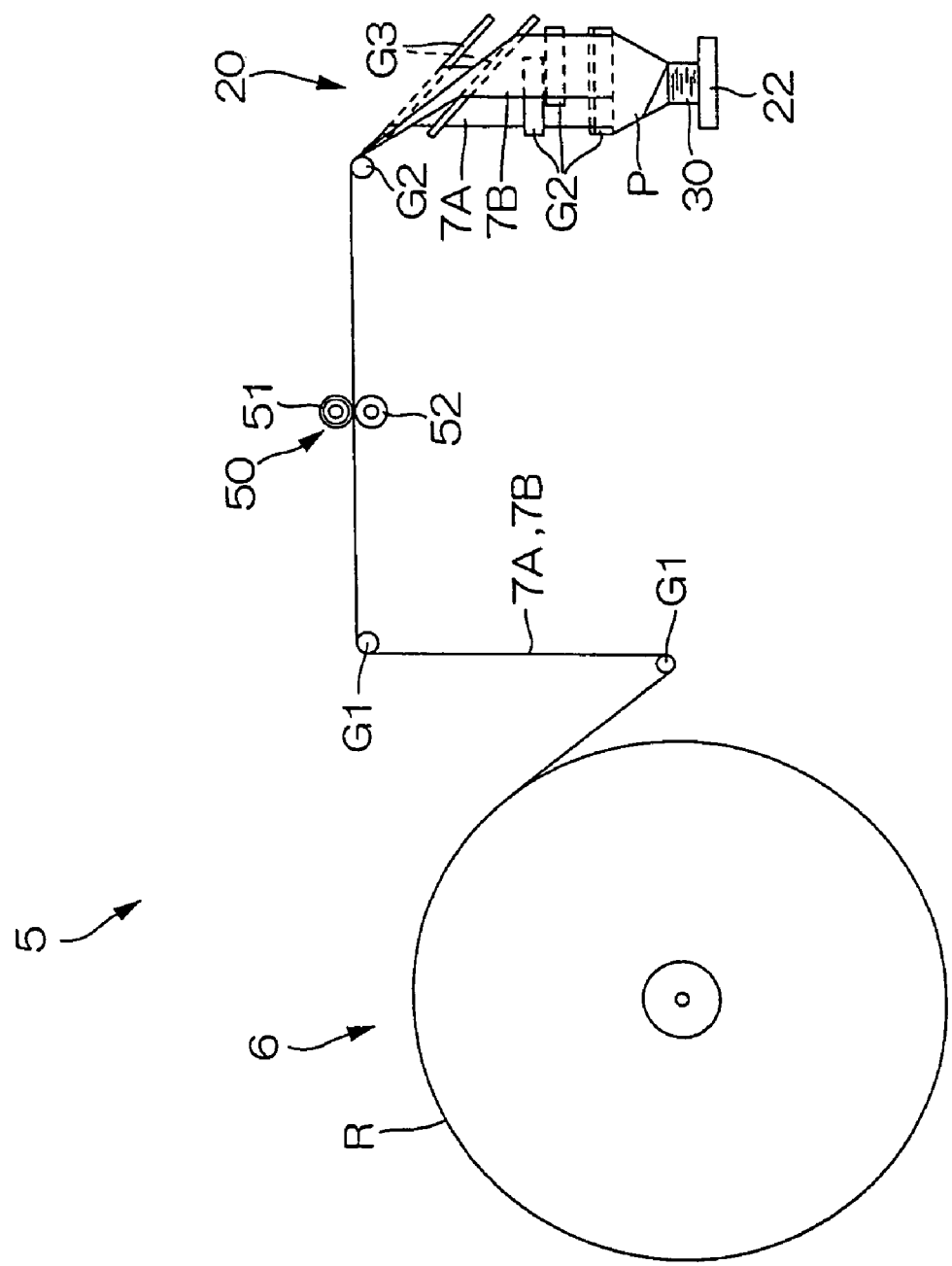
FIG. 14 is an elevational view showing an interfolder.

In accordance with the present invention, emboss bonding between plies is conducted prior to folding. Specifically, it is recommended that an emboss bonding apparatus be provided on a sheet guide path from a paper roll support 6 to a folding mechanism 20 as shown in FIG. 14, preferably a sheet guide path from the exit of a slitter apparatus SR to the folding mechanism 20. The emboss bonding apparatus 50 preferably comprises a pair of rolls 51, 52, the roll 51 having emboss convexes 51a on the outer periphery thereof so that sheets 7A, 7B are sandwiched between the rolls 51, 52 for embossing them. Thus, sheets 7A, 7B which are being conveyed from the paper roll support 6 to folding mechanism 20 can be subjected to emboss working so that the plies are bonded to each other. At this time, it is preferable that the operating speed of the interfolder 5 be not higher than 150 m/minute, particularly 120 to 140 m/minute.

Figure 15:
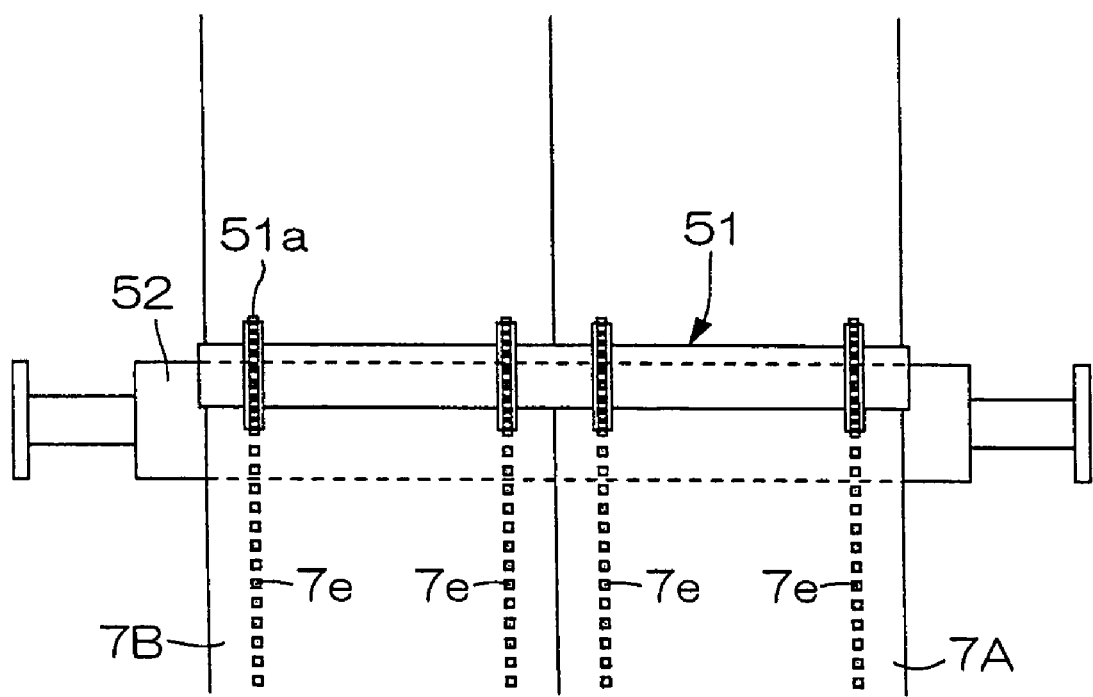
FIG. 15 is an enlarged plan view showing a part of emboss bonding apparatus.

It is preferable to provide an emboss bonding apparatus 50 for each of the folding boards P, P . . . so that both of the sheets 7A, 7B in pair which are conveyed to one folding board P are processed by one emboss bonding apparatus 50. FIG. 15 shows an example of the emboss roll 51 which is adapted to such an arrangement of the emboss bonding apparatus 50. Emboss bonding position on each sheet 7A, 7B may be appropriately determined. The sheet 7A, 7B are generally emboss bonded (7e, 7e) at the opposite edges in a width direction.

Since the emboss bonding between the plies is conducted by the interfolder 5 in such a manner in accordance with the present invention, emboss can be more uniformly provided in comparison with prior art in which the emboss bonding is conducted by a ply-machine, the operation speed of which is relatively higher, resulting in that separation of plies, tearing of paper at the embossed portion and breaking is hard to occur. Since the operation speed is low, folding operation will not become unstable.

(Other Features)

The present invention is not limited to the illustrated interfolder, but is applicable to any other interfolders if they use folding bards. For example, the present invention is applicable to an interfolder in which a paper roll having the same width as that of the product tissue paper, or an interfolder in which a paper roll having the width which is double of that of the product tissue paper is split into continuous sheets each having the same width as that of the product tissue by a slitter provided on the interfolder prior to folding, and any known interfolder. The present invention is particularly preferable for the interfolder on which a paper roll R is mounted comprising plural rolls which are preliminarily cut by a ply-machine, said rolls are rolled so that roll has a width which is several times as that of the product tissue paper.

Preferably the present invention is easily applicable to existing tissue paper manufacturing facility comprising ply-machines and interfolders in which primary paper roll is split to some extent by the ply-machines and split to product width by the interfolders. In this case, stabilization of processing can be achieved without lowering the processing speed of the ply-machine due to the fact that the ply-machine does not include emboss bonding means as mentioned above. However, the present invention is not limited to this Emboss bonding may be conduced in the ply-machine and interfolder.

D. An Embodiment of the Invention for Sanitary Tissue Paper Package and Apparatus and Method for Conveying Same Embodiments of the above noted invention will be described in detail with reference to sanitary tissue paper. The package in which tissue paper is packed is referred to as "tissue carton".

D-1. An Embodiment of the Invention for Sanitary Tissue Paper Packaging

Configuration of General Tissue Carton

Figure 17:
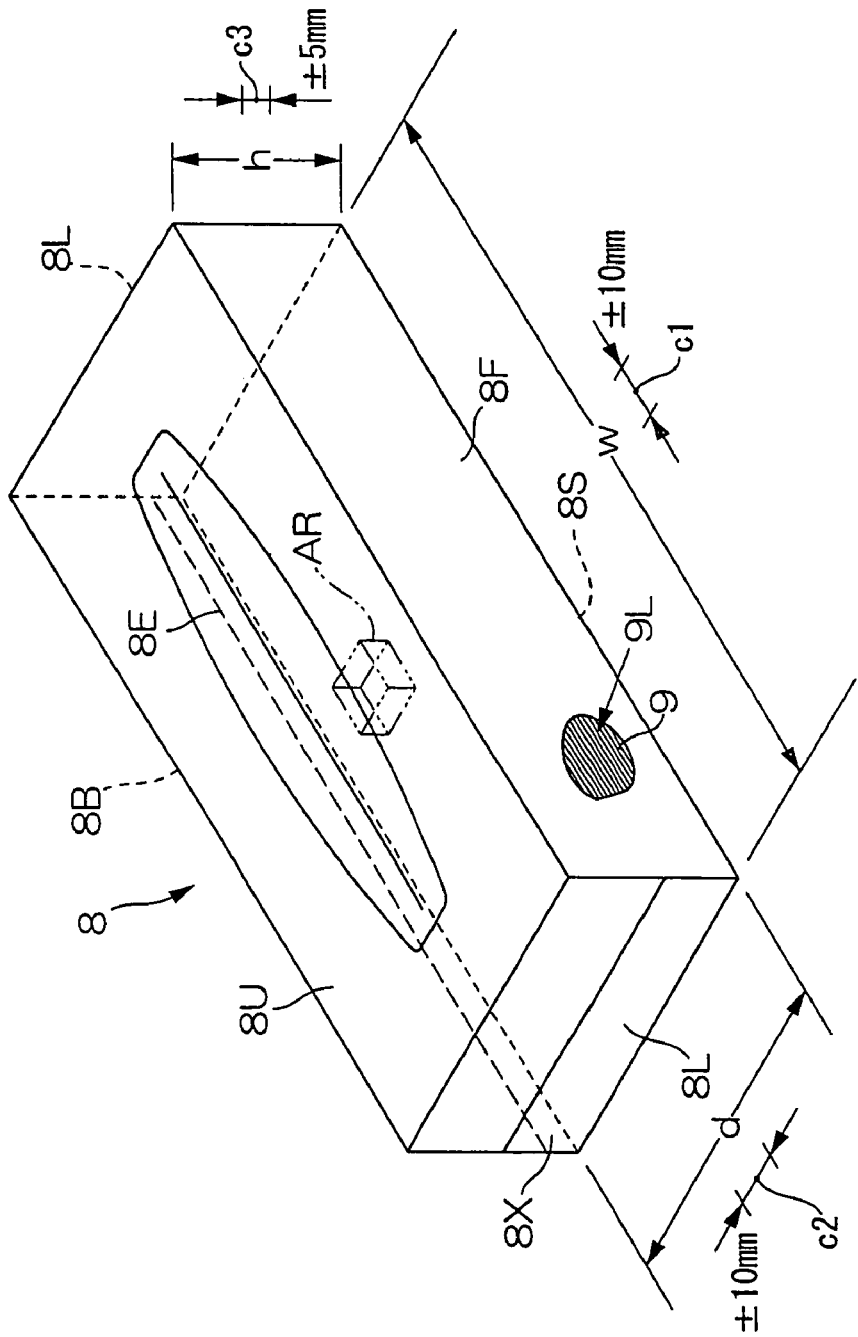
FIG. 17 is a schematic view showing a tissue carton.

The tissue carton is parallelogram in shape as designated at 8 in FIG. 17. A number of tissue paper sheets each having an area of 420 $cm^2$ are folded in a Z-manner and stacked while the side edges of the adjacent sheets are engaged and packed in the tissue carton. The carton is formed in the top face 8U with an exit opening 8E. In case of pull out 2-ply product, the tissue paper comprises 300 sheets (150 sets) to 500 sheets (250 sets), particularly 360 sheets (180 sets) to 400 sheets (200 sets) which are stacked. The weight of the carton 8 is about 150 to 250 g.

A term "bottom" used herein for the tissue carton refer to a face (8s) which is opposite to the face (upper face U) which is formed with a pull out opening 8E. Terms "front face" and "rear face" refer to any of two sides which are longer among four sides, as represented by 8F and 8B. A term "side face" refers to any of two sides which is shorter among four sides, as represented by 8L, 8L.

The tissue carton generally has a width w of 233-253 mm, a depth d of about 110 to 130. General cartons have a height h of 80 to 90 mm. Compact type cartons have a height of 60 to 70 mm. Ultra compact cartons have a height which is less than 60 mm, particularly 20 to 55 mm. FIG. 17 is dawn in accordance with the ratio of dimensions of ultra compact type carton.

(Tissue Carton of the Present Invention)

The tissue carton 8 belongs to a category of ultra compact type tissue carton in outer dimension. The tissue stack 9L has a width of 220 to 240 mm, a depth of 105 to 125 mm and a height of 40 to 60 mm. The space between the inner side of the carton and the tissue paper stack 9L is determined so that a total space at both sides in a width direction is 10 to 16 mm, a total space at both sides in a depth direction is 0 to 2 mm and the total space at both side in a height direction is substantially zero.

As remarked in FIG. 17, the tissue carton 8 of the present invention is configured so that the gravity center position of the whole of the carton is positioned in the range AE which is ±10 mm, ±10 mm and ±5 mm in a width, depth and height directions relative to the center positions c1, c2 and c3 of the width, depth and height, respectively, for preventing the carton from turning over.

Since the carton has such a gravity center characteristic, turning over and unstable attitudes of the carton is not liable to occur if the carton is conveyed with the front or rear face 8F or 8F side down or it is conveyed in a height direction.

It is preferable to configure the carton so that the dynamic friction coefficient on the front or rear face thereof is 0.15 to 0.25, particularly 0.20 to 0.22 and that the static friction coefficient thereon is 0.18 to 0.33, particularly 0.28 to 0.30 since turning over effect can be enhanced. Therefore, printing or coating pattern on the surface of the carton, and printing or coating material can be appropriately selected.

The usual tissue carton made of paper has a thickened portion 8X comprising stacked and bonded paper on either of front or rear side for making the carton cylindrical. Since the gravity center of the tissue carton is offset to a side having this thickened portion 8X, conveying with low gravity attitude is made possible if it is conveyed with the thickened portion 8X side down.

D-2. An Embodiment of the Invention for Sanitary Tissue Package Conveying Apparatus Tissue Carton which is an Object of the Invention The invention provides its operation and advantage independently of the type and conveying attitude of the tissue carton. However, compact type or ultra-compact type carton has the front face 8F or rear face 8B which is very small in area. Turning over is inevitable unless the conveying speed of the conveying apparatus is decreased when the carton is conveyed with the front face 8F or rear face 8B side down or it is conveyed in a height direction. The present first conveying method is particularly preferable to convey such compact type or ultra-compact type tissue carton with the front face 8F or rear face 8F side down.

(Examples of Conveying Apparatus)

Figure 18:
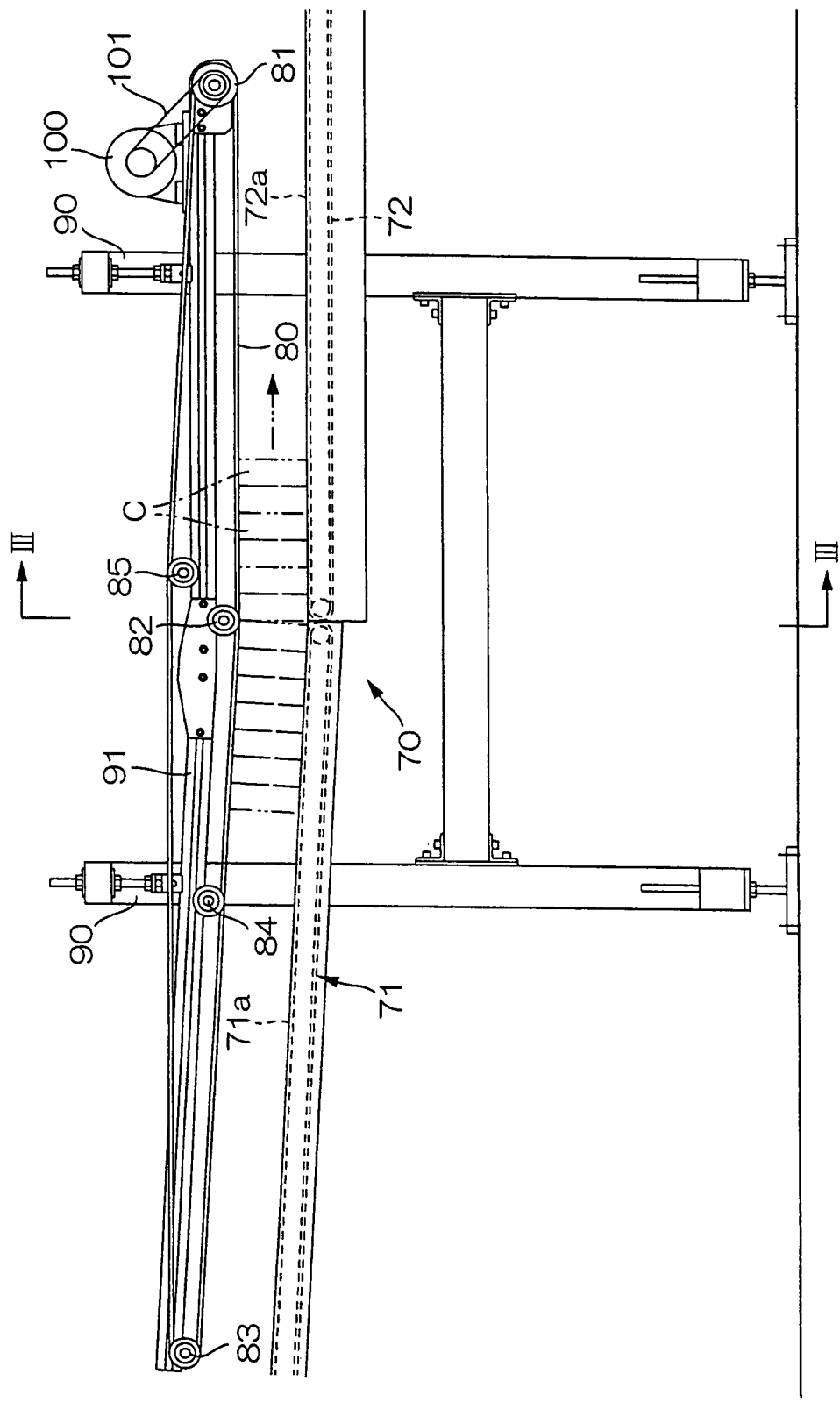
FIG. 18 is a schematic front view showing an exemplary conveying apparatus.
Figure 19:
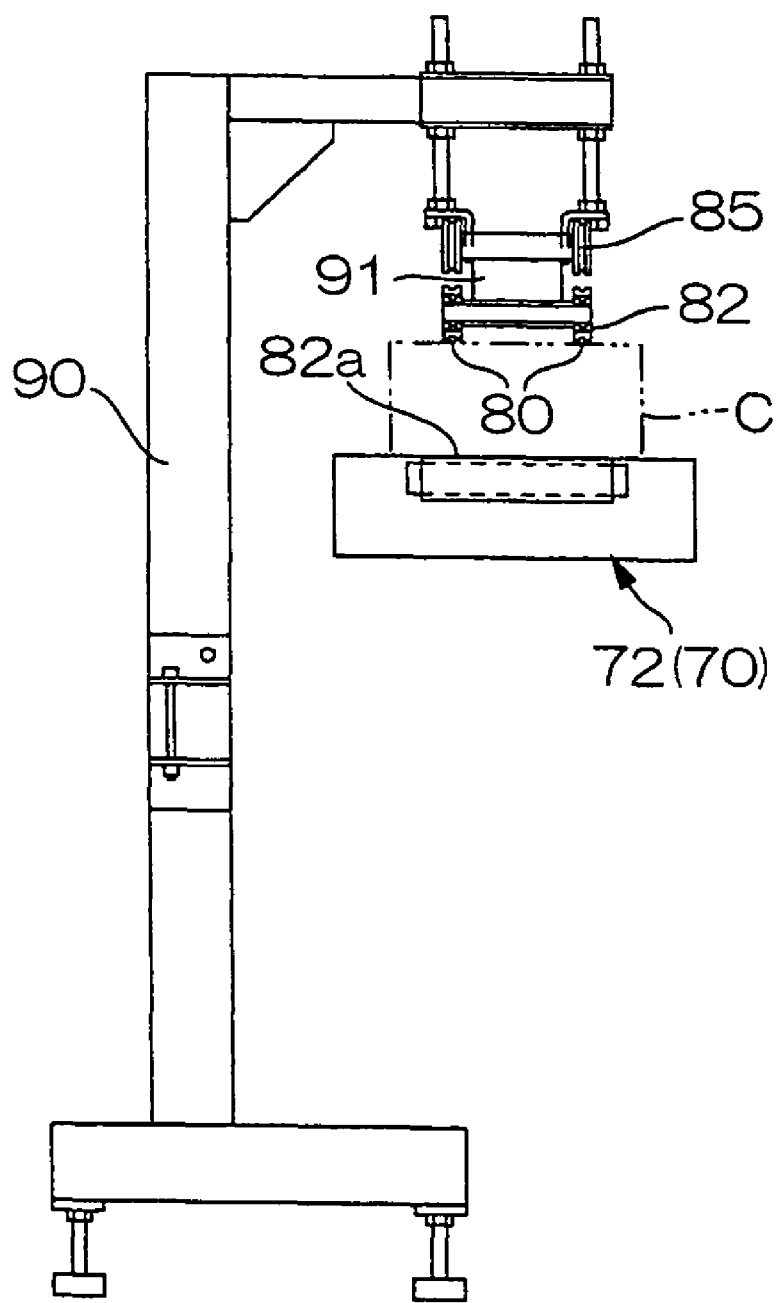
FIG. 19 is a sectional view taken along the line III-III in FIG. 2.

FIGS. 18 and 19 show an exemplary conveying apparatus of the invention. Numerals 71 and 72 in the drawing denote a set of the belt conveyor which constitutes a transfer apparatus 70 of the second invention.

In the example, an upstream conveyer belt 71 is tilted in such a manner that a transfer face 71a of the belt 71 is lowered as it approaches to a downstream belt conveyor 72. The downstream belt conveyor 72 has a transfer face 72a which is horizontal. Both belt conveyors 71, 72 are driven at the substantially same transfer speed for forming an integral constant speed transfer apparatus. The transfer speed of the transfer apparatus is, for example, about 40 to 100 m/minute. The tissue cartons on the upstream belt-conveyor 71 are transferred to the downstream belt-conveyor 72 without being rotated. Since the tissue cartons change their tilted attitude to erect attitude on transfer from the upstream belt conveyor 71 to the downstream belt conveyor 72 in this case, the carton C is liable to assume unstable attitudes or to turn over.

In order to prevent this, a carton attitude restriction member 80 is provided which moves along the tissue cartons C on the transfer apparatus 70 at a speed which is in the range of ±10%, preferably ±5% of the transfer speed of the transfer apparatus in accordance with the present invention in the illustrated example.

More specifically, a pair of posts 90, 90 are provided in a spaced manner in a transfer direction on the one side of the transfer apparatus 70. A cantilever type beam 91 is supported between the posts 90, 90. The beam 91 is spaced above and from the transfer apparatus 70 and extends in a transfer direction before and after the transfer position. Since the upstream belt conveyor 71 is tilted in the illustrate case, the potion of the cantilever beam 91 corresponding thereto in a transfer direction is also tilted. The cantilever beam 91 is provided at the downstream end, at the position corresponding to the transfer position and at the upstream end thereof with a drive pulley 81, guide pulley 82 and return pulley 83, respectively having lateral axes which are perpendicular to the transfer direction. An endless belt 80 which is equivalent to the attitude restriction member is tensioned on and around the pulleys 81 to 83. A guide pulley 84 and/or a tension pulley 85 for adjusting the tension of the guide belt may be provided according to needs if the distance between the drive pulley 81 and the return pulley 83 is long. As is apparent from FIG. 18, if cord belts are used as the endless guide belt 20, a plurality of cord belts which are spaced in a lateral direction perpendicular to the transfer direction. On the other hand, a rotational drive source 100 such as electric motor is linked to the drive pulley 81 via the drive belt 101.

In such a manner, the endless guide belt 80 which extends through the transfer position in a transfer direction is disposed. The inner side portion of the endless guide belt 80 is moved along the tissue cartons C by a drive power from the rotation drive source at a speed in the range of 10%, preferably 5% of the transfer speed of the transfer apparatus. Although the separation distance between the lower side of the endless guide belt 80 and the tissue carton C can be appropriately determined, it is preferably about 0 to 10 mm to perform the attitude restriction function excellently.

Provision of the endless guide belt 80 which moves along the tissue cartons at a speed which is close to or the same as the transfer speed of the transfer apparatus 70 makes it possible to support the tissue cartons C for restricting the attitude even if the attitude of the tissue carton C become unstable. Accordingly, the tissue carton c is positively prevented from assuming unstable attitudes or turning over without decreasing the transfer speed of the transfer apparatus. Therefore, manufacturing efficiency is not lowered.

By disposing the carton attitude restriction member 80 so that it is spaced above the transfer apparatus as is illustrated in the drawing, an effect for preventing the cartons from assuming unstable attitudes in a transfer direction and turning over is enhanced. Since there is often an open space above the transfer apparatus, a simple apparatus arrangement may be adopted and unrestricted installation is enabled.

(Other Features)

Although the transfer apparatus in the foregoing case comprises the upstream belt conveyor 71 having a transfer face 71a which is lowered as it approaches downstream, and the downstream belt conveyor 72 having the horizontal transfer face 72a, the downstream belt conveyor may be tilted, alternatively the upstream belt conveyor is horizontal and the downstream belt conveyor may be tilted, alternatively both upstream and downstream belt conveyors may be horizontal, or it may comprise single horizontal or tilted belt conveyor (not shown).

Although the attitude restriction member (endless guide belt 80) is separated from and above the transfer apparatus 70 in the above-mentioned case, the same operation and advantage is provided by providing the attitude restriction members on the both sides of the transfer apparatus for sandwiching the tissue cartons therebetween.

It is preferable to provide the conveying apparatus of the present invention in the position in which the attitude of the tissue cartons is liable to be unstable on conveying of the tissue cartons, for example in the position in which the transfer face is curved or tilted.

Although the carton attitude restriction member of the above-mentioned embodiment is an endless guide belt it may be any member having an appropriate shape if it is movable along the cartons in a manner which is defined in the present invention. In case of flat belt, the attitude restriction function is sufficiently performed even if a plurality of belts are not provided in a lateral direction perpendicular to the transfer direction unlike the illustrated embodiment.

D-3. An Embodiment of the Invention for Apparatus for Conveying Sanitary Tissue Paper Packages Tissue Carton to which the Invention is Applied The above noted invention provides its operation and advantage irrespective of the type of tissue carton and conveying attitude similarly to the invention as set forth and is particularly preferable for conveying of the compact type or ultra-compact type tissue cartons in a height direction with their front or rear face side down.

(An Example of Conveying Apparatus)

Figure 20:
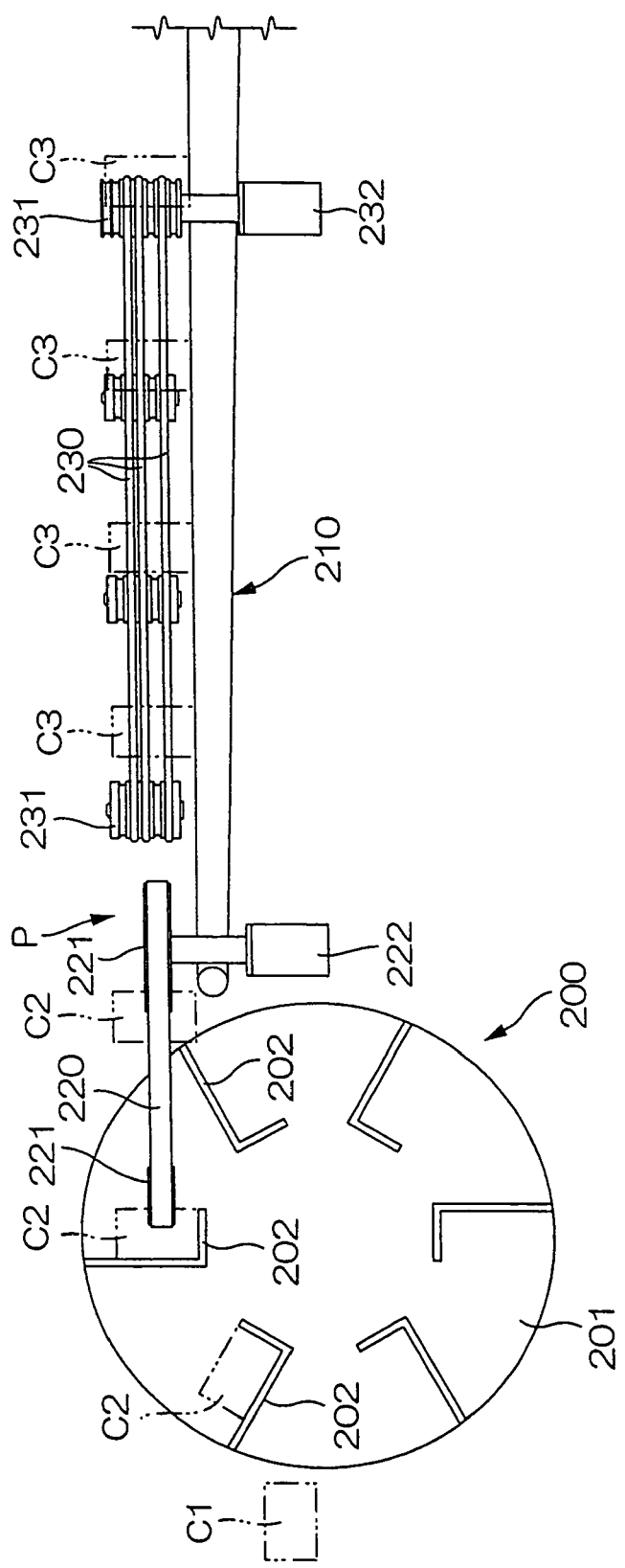
FIG. 20 is a schematic front view showing an exemplary deceleration conveying apparatus.
Figure 21:
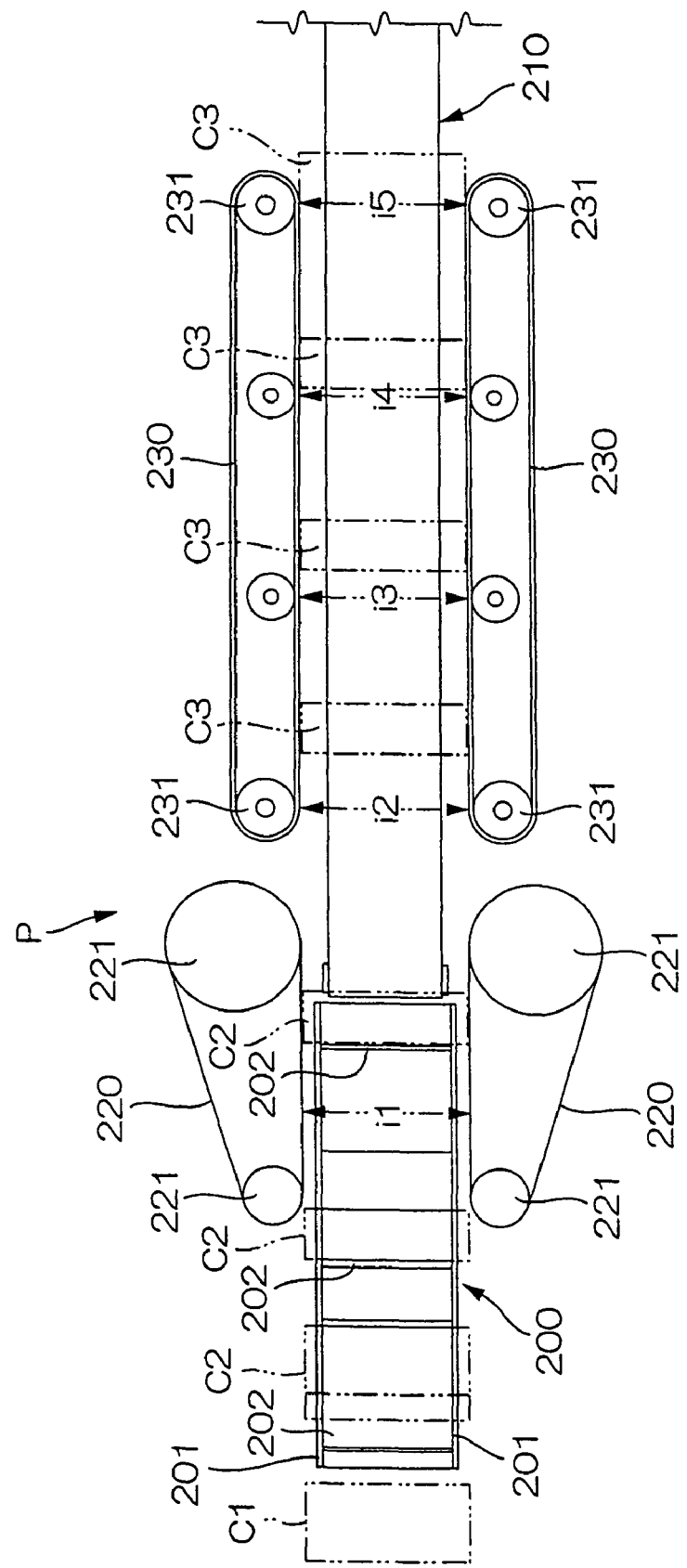
FIG. 21 is a schematic plan view showing an exemplary deceleration conveying apparatus.
Figure 22:
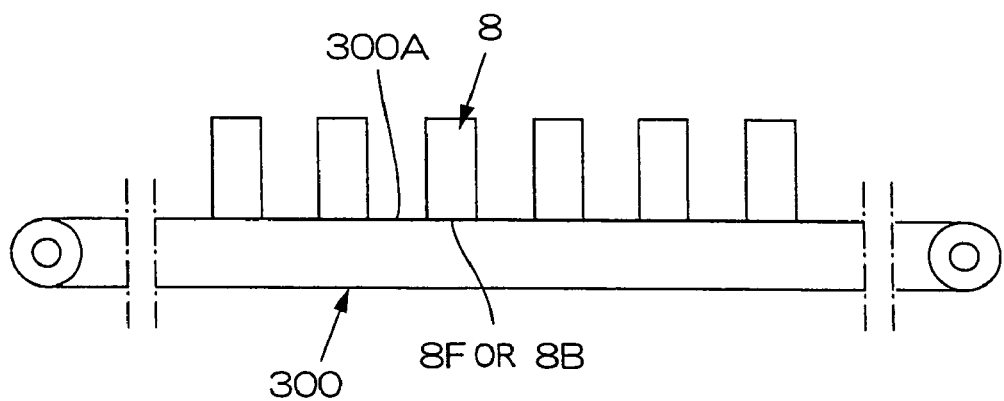
FIG. 22 is a front view showing a transfer attitude.
Figure 23:
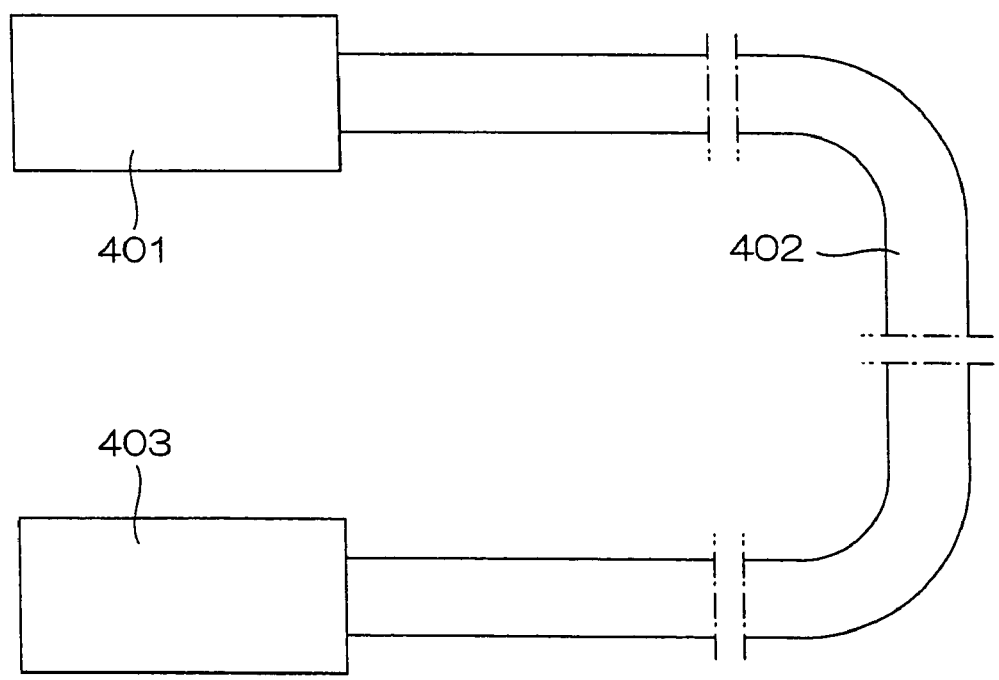
FIG. 23 is a schematic view showing an exemplary processing line.

FIGS. 20 and 21 show an example of the conveying apparatus of the tissue cartons of the present invention. A reference numeral 200 in the drawing denotes a carton erecting and feeding apparatus which is equivalent to the stream transfer apparatus of the present invention. The carton erecting and feeding apparatus 200 comprises a plurality of carton placing units 202, 202 . . . which are secured spacedly in a peripheral direction between rotary plates 201 and 201, each of which is rotatable around a lateral center axis perpendicular to the transfer direction. A reference numeral 210 denotes a belt conveyor which is connected to the feed out side of the carton erecting and feeding apparatus 200 which is equivalent to the downstream feeding apparatus of the present invention.

In the carton erecting and feeding apparatus 200, the carton placing units 202, 202 are driven to rotate clockwise in the drawing together with the rotary plates 201, 201 by a rotation drive source such as motor (not shown). In the course of the rotation, the tissue cartons C1 which are conveyed in a depth direction with their bottoms side down are successively transferred from the left position in the drawing on the placing units which are in the position of nine o'clock. The transferred cartons C are rotated to a position of 12 o'clock so that they are erected to a position with the front and rear face side down. The cartons having such an attitude are discharged on the downstream belt conveyor 210 in a direction of carton height. The carton erecting and feeding apparatus 200 conducts attitude changing and transfer of the cartons at a speed of about 100 to 180 m/minute.

The tissue cartons C3 which are fed from the carton erecting and feeding apparatus 200 are placed on the downstream belt conveyor 210 while keeping its feeding out attitude and are conveyed in a height direction with the front or rear face side down. The downstream belt conveyor 210 conducts conveying at a conveying speed which is a half of that of the carton erecting and feeding apparatus 200. Thus, the tissue cartons C3 which has changed their attitudes into erect attitude at a high speed in the carton erecting and feeding apparatus 200 are transferred on the downstream belt conveyor 210 so that they are decelerated.

The configuration of the prior art decelerating and conveying apparatus has been described. In contrast to this, in accordance with the present invention upstream carton attitude restriction members 220, 220 which move at a speed in the range of ±10%, preferably ±5% with respect to the transfer speed of the carton erecting and feeding apparatus from a predetermined position to a transfer position along the cartons C2 for the downstream belt conveyor 210 are provided on the both sides of the carton erecting and feeding apparatus 200 and a downstream carton attitude restriction members 230, 230 which move from the carton transfer position P to a predetermined position along the cartons C3 at a speed in the range of ±10%, preferably ±5% with respect to the transfer speed of the downstream transfer apparatus are provided on the both sides of the downstream belt conveyor 210.

More specifically, a pair of pulleys 221, 221 are provided in a spaced manner in a transfer direction on the both sides of the feed-out portion of the carton erecting and feeding apparatus 200. Downstream endless guide belts 220, 220 are tensioned around and between the pair of the pulleys 221, 221 as downstream carton attitude restriction members. The rotation drive source 222 such as electric motor is linked to the downstream side pulley 221. Actuation of the rotation drive source 222 causes the upstream endless guide belts 220, 220 to be driven to rotate via the pulley 221. The inner side portions of the upstream endless guide belts 220, 220 are moved from a predetermined position to the transfer position P for the downstream belt conveyor 210 along the both sides of the cartons C2 which are being fed from the carton erecting and feeding apparatus 200 at a speed in the range of ±10%, preferably ±5% of the transfer speed of the carton erecting and feeding apparatus 200.

A pair of pulleys 231,231 are also provided in a spaced manner in a transfer direction on the both sides of the feed-out portion of the carton erecting and feeding apparatus 210. Downstream endless guide belts 230, 230 are tensioned around and between the pair of the pulleys 231, 231 as downstream carton attitude restriction members and are driven to rotate by the rotation drive source 232. The inner portion of the upstream endless guide belts 230, 230 are moved from a predetermined position to the transfer position P for the downstream belt conveyor 210 along the both sides of the cartons C3 at a speed in the range of ±10%, preferably ±5% of the transfer speed of the carton erecting and feeding apparatus 210.

In such a manner, the upstream and downstream transfer apparatus 200, 210 are provided with endless guide belts 220, 220 and 230, 230 respectively which are moved along the both sides of the carton at a speed which is close to or equal to the transfer speed of the corresponding transfer speed of the corresponding transfer apparatus. Even if the attitude of the tissue cartons C2 or C3 will become unstable due to the influence of the deceleration when the tissue carton C3 fed out from the carton erecting and feeding apparatus 200 is placed for transfer on the downstream belt conveyor 210 moving at a lower speed, the sides of the tissue cartons C2 or C3 are supported by the upstream or downstream endless guide belts 220, 220, 230, 230 which are moved at a close or equal speed in the same direction for restricting the attitude of the carton. Accordingly, unstable attitude or turning over of the tissue carton C2 or C3 is prevented. The tissue carton C2 or C3 is mechanically supported in response to the deceleration of the carton, so that the tissue carton can be decelerated without assuming the attitude of the tissue carton unstable even if the deceleration is high. Therefore, manufacturing efficiency will not be lowered.

On the other hand, the spacing i1 between the upstream endless guide belts is close to the width of the tissue carton C2 (wider than the carton width by about 0 to 10 mm) and is constant in a transfer direction as shown in FIG. 21. The spacing i2 to between the downstream endless guide belts is wider than the width of the tissue carton by about 10 to 15 mm at the upstream end and becomes narrower as it approaches to the downstream sides i3, i4, i5 until it is close to the width of the tissue carton C3 (larger than the carton width by about 0 to 15 mm) (that is, i2>i3>i4>i5). This can prevent the carton from assuming the unstable attitudes and/or turning over as well as make the receiving of the tissue carton C3 on the downstream belt conveyor smoother. In order to enable smooth transfer, it is preferable to position the downstream end of the upstream endless guide belt 220 in a level which is different from that in which the upstream end of the downstream endless guide belt 230 is positioned so that they are overlapped to such other in a transfer direction.

(Other Features)

Although the attitude restriction members (endless guide belts 220, 230) are provided on the both sides of the transfer apparatus (erecting apparatus 200, belt conveyor 210) in the foregoing case, similar operation and advantage can be obtained by providing an attitude restriction member which is separated from and above the transfer position of the transfer apparatus to sandwich the tissue carton between the transfer apparatus and restriction member (not shown). In this case, it is preferable that the spacing between the downstream attitude restriction member and the carton placed face of the upstream transfer apparatus be equal to the height of the tissue carton and be constant in a transfer direction the spacing between the downstream attitude restriction member and the carton placed face of the downstream transfer apparatus is larger than the height of the tissue carton at the downstream end by about 10 to 15 mm and becomes narrower as approaching o downstream side until it equals to the height of the tissue carton (larger than the height of the carton by about 1 to 10 mm).

In the present invention, one of the upstream and downstream transfer apparatus may be provided with the attitude restriction member so that it is separated from and above the transfer position of the transfer apparatus and the other may provided on the both sides thereof with the attitude restriction members.

Although the erecting apparatus is relevant to the upstream transfer apparatus in the above-mentioned case, the present invention is not limited to this. For example, the upstream transfer apparatus may be formed of a belt conveyor. The decelerated conveying apparatus may be provided in any position where deceleration of the tissue carton is required in the conveying apparatus. For example, it may be provided upstream of the line distributing apparatus, inspecting apparatus, or packaging apparatus.

Although the carton attitude restriction member in the above-mentioned case is an endless guide belt, a member which is in any of a number of shapes may be moved along the cartons if it is movable in a manner which is specified by the present invention.

Although the upstream carton attitude restriction member is a flat belt and the downstream carton attitude restriction member is a cord belt in the illustrated case, it may be vice versa, or both may be flat belts or cord belts.

D-4. An Embodiment of the Invention for Conveying Sanitary Tissue Paper Packages The above noted invention is applied to a case in which ultra-compact type tissue carton is placed and conveyed with the front or rear face side down and contemplates to prevent of the tissue carton from turning over when it is accelerated or decelerated.

(Tissue Carton to which the Present Invention is Applied)

The tissue carton to which the invention is applied is the above-mentioned ultra-compact type tissue carton.

(Attitude of the Tissue Carton when it is Transferred)

The present invention is applied in a mode of placing the tissue carton 8 on the transfer face of the transfer apparatus 300 with the front face 8F or the rear face 8F is side down and transferring the tissue carton 1 by moving the transfer face 300A while keeping the placing attitude. Belt conveyor or known apparatus may be used as the transfer apparatus 300.

Assuming such a transfer attitude of the ultra-compact type tissue carton 8 remarkably enhances the transfer efficiency since the height of the carton 8 (which is not the height in an erect attitude, but the length in a transfer direction). In this case, there is a disadvantage that the carton 8 is liable to turn over when the transfer speed is changed. This technique contemplates to assume the transfer attitude on transferring of the ultra-compact type tissue carton 8 to enhance the processing efficiency and to effectively prevent the carton 8 from possible turning over when the transfer speed is changed in combination of control of changing the transfer speed which will be described hereafter. (Example of processing line)

The present invention is preferable particularly to a processing line for automatically conducing a continuous processing, comprising an apparatus 401 for forming tissue cartons by packing a tissue paper stack and for feeding the formed tissue cartons in an erect position with the front or rear face side down, a transfer apparatus 402 such as belt conveyor for sequentially transferring tissue cartons in an erect position and an apparatus for sequentially packaging a plurality of tissue cartons transferred from said transfer apparatus as one set. The present invention is also applicable to the other type processing apparatus provided that it includes the transfer apparatus 402 such as belt conveyor.

(Operation Control)

The present invention changes the transfer speed at a rate of 0.01 to 1.00 m/s$^2$, preferably 0.10 to 0.30 m/s$^2$ as preconditions of abode-mentioned tissue carton, its attitude on transferring, and the transfer apparatus.

Figure 24:
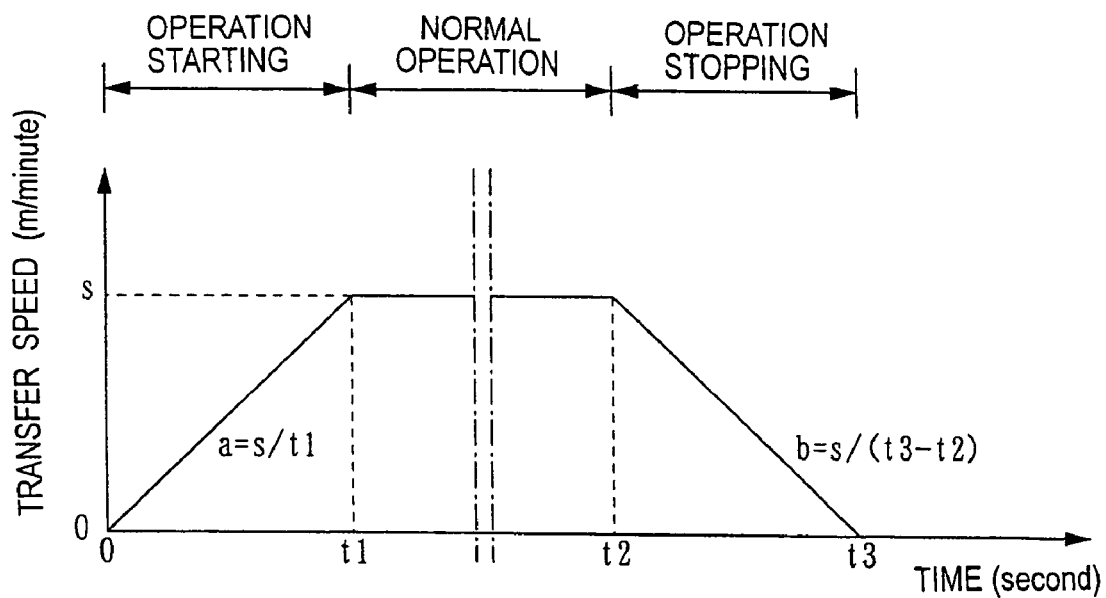
FIG. 24 is a graph showing an exemplary control of processing line operation.

An example of control of the operation of the tissue carton processing line in accordance with the present invention is illustrated in FIG. 24. That is, the transfer speed is increased from 0 m/minute to 35 m/minute or more at a rate a of 0.01 to 1.00 m/s$^2$ at the beginning of the line operation. Thereafter, a normal operation is conducted while keeping the speeds of 35 m/minute or more. The transfer speeds of the transfer face of 35 m/minute or more on the normal operation is decreased to 0 m/minute at a rate of 0.01 to 1.00 m/s$^2$ until the line operation is stopped. The transfer speed may be charged at the same rate if needed at time other than the beginning and end of the operation.

Conducting such a control of changing the transfer speed makes it possible to positively prevent the tissue carton from turning over when the transfer speed is changed for starting or stopping the operation as is apparent from the foregoing embodiments even if ultra-compact type tissue paper having a height less than 6 cm is transferred while it is placed on the transfer face of the transfer apparatus is an erect position with its front or rear face side down. Since it is possible to transfer the tissue cartons in an erect position with its front or rear face side down, the transfer efficiency can be enhanced to a maximum.

As viewing the whole of the processing line of the tissue carton, if turning over of a tissue carton occurs particularly in the beginning of operation, labor or time is required to process it, so that the processing efficiency may be lowered. Such a problem is overcome by the present invention. Due to the turning over preventing effect which is provided by the transfer of the tissue cartons in an erect position and control of the transfer speed, the transfer speed of normal operation can be increased to 35 m/minute or more, so that the processing efficiency can be enhanced to 550 cartons/minute or more.

Example

A number of tissue cartons were placed on a belt conveyor. The conveyor was accelerated or decelerated at different accelerations ten times. The rate of occurrence of turning over of the tissue cartons was checked. Test conditions and the rate of the turning over are shown in Table 4.

TABLE 4

|  | Acceleration (m/s²) | Turning over |
| --- | --- | --- |
| Example 1 | 0.01 | None |
| Example 2 | 0.10 | None |
| Example 3 | 0.30 | None |
| Example 4 | 0.50 | Once per 10 accelerations |
| Example 5 | 1.00 | Once per 10 accelerations |
| Control 1 | 1.2 | 6 times per 10 accelerations |
| Control 2 | 2.0 | 10 times per 10 accelerations |

Examples 1 to 5 in which the acceleration is in the range of the present invention is remarkably more excellent in turning over effect than controls 1 and 2. No tissue carton was turned over in Examples 1 to 3.

What is claimed is:

1. A facility for manufacturing a sanitary tissue paper product formed of a plurality of interfolded multi-ply webs arranged in a stack, said facility comprising:

a ply machine having a primary paper roll supply for providing a pair of moving webs, said ply machine having means for forming an unbonded multi-ply web from said pair of webs, said ply-machine having means for taking up said multi-ply web and storing said multi-ply web in a secondary paper roll; and an interfolder having means for receiving at least one secondary paper roll for providing a plurality of unbonded, multi-ply webs for the sanitary tissue paper product, said interfolder forming a web guide path for said multi-ply webs along which said plurality of multi-ply webs are arranged to be adjacent but not overlapped, said web guide path extending from said secondary paper roll receiving means to an interfolding means for moving said plurality of multi-ply webs from the former to the latter, emboss bonding means interposed along said web guide path upstream of said interfolding means for embossing each of said unbonded, adjacent, multi-ply webs as they move along said web guide path to bond the plies of each web together prior to reaching said interfolding means to form bonded multi-ply webs, said interfolding means interfolding said plurality of bonded multi-ply webs and arranging them in a stack to form the sanitary tissue paper product, said interfolder operating at a web movement speed at which the bonding of said plies of said multi-ply webs by said emboss bonding means is satisfactorily carried out, the operating speed of said interfolder being less than the operating speed of said ply machine.

2. The facility according to claim 1 wherein said emboss bonding means is further defined as a common emboss bonding means for emboss bonding both said adjacent multi-ply webs.

3. The facility according to claim 1 wherein said interfolder operates at a web speed of 150 meters per minute or less.

4. An interfolder for producing a sanitary tissue paper product formed of a plurality of interfolded multi-ply webs arranged in a stack, said interfolder having means for receiving at least one unbonded, multi-ply web storage roll for providing a plurality of unbonded multi-ply webs for the sanitary tissue paper product, said interfolder forming a web guide path for said multi-ply webs along which said plurality of multi-ply webs are arranged to be adjacent but not overlapped, said web guide path extending from said web storage roll receiving means to an interfolding means for moving said plurality of multi-ply webs from the former to the latter, emboss bonding means interposed along said web guide path upstream of said interfolding means for embossing each of said unbonded, adjacent, multi-ply webs as they move along said web guide path to bond the plies of each web together prior to reaching said interfolding means to form bonded multi-ply webs, said interfolding means interfolding said plurality of bonded multi-ply webs and arranging them in a stack to form the sanitary tissue paper product, said interfolder operating at a web movement speed at which the bonding of the plies of said multi-ply webs by said emboss bonding means is carried out in a satisfactory manner.

5. The interfolder according to claim 4 wherein said emboss bonding means is further defined as a common emboss bonding means for emboss bonding both said adjacent multi-ply webs.

6. The interfolder according to claim 4 wherein said interfolder operates at a web speed of 150 meters per minute or less.

* * * * *

UNITED STATES PATENT AND TRADEMARK OFFICE
CERTIFICATE OF CORRECTION

PATENT NO. : 7,775,958 B2   Page 1 of 1
APPLICATION NO. : 11/601989
DATED : August 17, 2010
INVENTOR(S) : Takeharu Mukai et al.

It is certified that error appears in the above-identified patent and that said Letters Patent is hereby corrected as shown below:

On the Title page, item:

(75) Inventors: Delete "Takenaru Mukai, Iyomishima (JP)" and replace with --Takeharu Mukai, Iyomishima (JP)--

Signed and Sealed this

Ninth Day of November, 2010

David J. Kappos
*Director of the United States Patent and Trademark Office*